US 7,627,863 B2

(12) United States Patent
Chen

(10) Patent No.: US 7,627,863 B2
(45) Date of Patent: *Dec. 1, 2009

(54) TYPED INTERMEDIATE LANGUAGE SUPPORT FOR LANGUAGES WITH MULTIPLE INHERITANCE

(75) Inventor: Juan Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

This patent is subject to a terminal disclaimer.

(21) Appl. No.: 11/332,819

(22) Filed: Jan. 13, 2006

(65) Prior Publication Data

US 2007/0169029 A1 Jul. 19, 2007

Related U.S. Application Data

(63) Continuation of application No. 11/332,818, filed on Jan. 13, 2006.

(51) Int. Cl.
*G06F 9/45* (2006.01)
*G06F 9/44* (2006.01)
(52) U.S. Cl. .......................... 717/146; 717/108; 717/116
(58) Field of Classification Search ......... 717/146–150, 717/108, 116
See application file for complete search history.

(56) References Cited

U.S. PATENT DOCUMENTS

| 4,667,290 A * | 5/1987 | Goss et al. ................... 717/147 |
| 5,301,327 A * | 4/1994 | McKeeman et al. ......... 717/145 |
| 5,659,573 A | 8/1997 | Bruckert et al. |
| 5,765,039 A * | 6/1998 | Johnson ....................... 719/328 |
| 5,836,014 A | 11/1998 | Faiman, Jr. |
| 5,953,524 A * | 9/1999 | Meng et al. .................. 717/108 |
| 5,966,702 A * | 10/1999 | Fresko et al. .................... 707/1 |
| 5,987,256 A * | 11/1999 | Wu et al. ...................... 717/146 |
| 6,271,864 B1 * | 8/2001 | Graham ........................ 345/442 |
| 6,560,774 B1 * | 5/2003 | Gordon et al. ............... 717/146 |
| 6,581,063 B1 * | 6/2003 | Kirkman ...................... 707/100 |
| 6,738,967 B1 * | 5/2004 | Radigan ...................... 717/146 |
| 6,874,140 B1 * | 3/2005 | Shupak ........................ 717/131 |
| 6,993,751 B2 * | 1/2006 | Bhansali et al. ............. 717/137 |
| 7,120,898 B2 * | 10/2006 | Grover et al. ................ 717/114 |
| 7,152,229 B2 * | 12/2006 | Chong et al. ................ 717/146 |
| 7,171,655 B2 * | 1/2007 | Gordon et al. ............... 717/146 |
| 7,308,680 B2 | 12/2007 | Grover et al. |
| 7,383,552 B2 * | 6/2008 | Hudis et al. .................. 719/316 |
| 7,430,670 B1 * | 9/2008 | Horning et al. .............. 713/190 |
| 7,565,647 B2 * | 7/2009 | Davidov et al. ............. 717/140 |
| 2007/0169040 A1 | 7/2007 | Chen |

OTHER PUBLICATIONS

Rupakheti et al, "An empirical study of the design and implementation of object equality in Java", ACM CASCON, pp. 1-15, 2008.*

(Continued)

*Primary Examiner*—Anil Khatri
(74) *Attorney, Agent, or Firm*—Klarquist Sparkman, LLP

(57) ABSTRACT

A typed intermediate representation of source code written in a language that supports multiple inheritance is presented. The typed intermediate representation uses paths to represent objects embedded in other objects. For each class, an exact record type represents layout of complete objects of that class. An approximated record type describes layout of inner objects when the runtime types of the objects are statically unknown. Address arithmetic is represented by special instructions and type-checked to ensure proper pointer adjustment. Types are also given to "this" pointers of methods within classes. These "this" pointer types refer to the paths associated with the object.

15 Claims, 9 Drawing Sheets

OTHER PUBLICATIONS

Naeem et al, "Inheritance and subtyping methods, modifications and analytical quantification", IEEE, pp. 737-742, 2004.*

Bierhoff et al, "Modular typestate checking of aliased objects", ACM OOPSLA, pp. 301-319, 2007.*

Ruby et al, "Safely creating correct subclasses without seeing superclass code", ACM OOPSLA, pp. 208-228, 2000.*

Chen, Chiyan, Shi, Rui and Xi, Hongwei, "*A Typed Approach to Object-Oriented Programming with Multiple Inheritance*," Boston University, Computer Sciences Department, pp. 23-38, 2004.

Chen, Juan and Tarditi, David, "*A Simple Typed Intermediate Language for Object-Oriented Languages*," Microsoft Research, Microsoft Corporation, 12 pages, POPL'05, Jan. 12-14, 2005.

Colby, Christopher; Lee, Peter; Necula, George C.; Blau, Fred; Plesko, Mark; Cline, Kenneth, "*A Certifying Compiler for Java*," pp. 95-107, PLDI 2000, 2000.

Compagnoni, Adriana B. and Pierce, Benjamin C., "*Higher-Order Intersection Types and Multiple Inheritance*," Computer Laboratory, University of Cambridge, Mathematical Structures in Computer Science, (1995), vol. 11, pp. 1-34.

"*Common Language Infrastructure (CLI), Part I: Concepts and Architecture*," final draft, Oct. 2002, Produced by ECMA TC39/TG3, 2002.

"*Common Language Infrastructure (CLI), Part. II: Metadata Definition and Semantics*," final draft, Oct. 2002, Produced by ECMA TC39/TG3, 2002.

"*Common Language Infrastructure (CLI), Part. III: CIL Instruction Set*," final draft, Oct. 2002, Produced by ECMA TC39/TG3, 2002.

"*Common Language Infrastructure (CLI), Part. IV: Profiles and Libraries*," final draft, Oct. 2002, Produced by ECMA TC39/TG3, 2002.

Gray, Jan, "*C++: Under the Hood*," Mar. 1994. http://msdn.microsoft.com/archive/defaultasp?url=/archive/en-us/dnarvc/html/jangrayhood.asp.

Morrisett, Greg; Walker, David; Crary, Karl; and Glew, Neal, "*From System F to Typed Assembly Language*," ACM Trans. on Programming Languages and Systems, 21(3):527-568, May 1999.

Remy, Didier, "*Programming Objects with ML-ART, an extension to ML with Abstract and Record Types*," International Conference on Theoretical Aspects of Computer Software, pp. 321-346, Springer-Verlag, 1994.

Shao, Zhong, "An Overview of the FLINT/ML Compiler," in ACM SIGPLAN Workshop on Types in Compilation, pp. 1-101, Jun. 1997.

Stroustrup, Bjarne, "*Multiple Inheritance for C++*," Proceedings of the Spring 1987 European Unix Users Group Conference, Helsinki, 1987.

Tarditi, D.; Morrisett, G.; Cheng, P.; Stone, C.; Harper, R.; and Lee, P., "*TIL: A Type-Directed Optimizing Compiler for ML*," in ACM SIGPLAN Conference on Programming Language Design and Implementation, pp. 181-192, 1996.

Wright, Andrew K. and Felleisen, Matthias, "*A Syntactic Approach to Type Soundness*," Information and Computation, 115(1):38-94, 1992.

Chen et al., "A Simple Typed Intermediate Language for Object-Oriented Languages," Microsoft Research, Microsoft Corporation, POPL'05, Jan. 12-14, 2005, 12 pages.

Chen et al., "A Typeful Approach to Object-Oriented Programming with Multiple Inheritance," Boston University, Computer Sciences Department, (2004) pp. 23-38.

Chen, "A Typed Intermediate Language for Compiling Multiple Inheritance," POPL '07, Jan. 17-19, 2007, 6 pages.

Colby et al., "A Certifying Compiler for Java," PLDI 2000, pp. 95-107 (2000).

Compagnoni et al., "Higher-Order Intersection Types and Multiple Inheritance," Computer Laboratory, University of Cambridge, Mathematical Structures in Computer Science, vol. 11 (1995), pp. 1-34.

"C++ Tutorial—this pointer," CoderSource.net, May 1, 2004, 2 pages.

"Common Language Infrastructure (CLI), Part II: Concepts and Architecture," final draft, Produced by ECMA TC39/TG3, Oct. 2002, 105 pages.

"Common Language Infrastructure (CLI), Part II: Metadata Definition and Semantics," final draft, Produced by ECMA TC39/TG3, Oct. 2002, 174 pages.

"Common Language Infrastructure (CLI), Part III: CIL Instruction Set," final draft, Produced by ECMA TC39/TG3, Oct. 2002, 131 pages.

"Common Language Infrastructure (CLI), Part IV: Profiles and Libraries," final draft, Produced by ECMA TC39/TG3, Oct. 2002, 20 pages.

Gray et al., "C++: Under the Hood," Mar. 1994, 25 pages http://msdn.microsoft.com/archive/default.asp?url=/archive/en-us/dnarvc/html/jangrayhood.asp.

Morrisett et al., "From System F to Typed Assembly Language," ACM Trans. On Programming Languages and Systems, vol. 21, No. 3, May 1999, pp. 527-568.

Polymorphism (computer science), Wikipedia, visited Dec. 27, 2005, 6 pages.

Remy et al., "Programming Objects with ML-ART, an extension to ML with Abstract and Record Types," International Conference on Theoretical Aspects of Computer Software, Springer-Verlag, 1994, pp. 321-346.

Shao et al., "An Overview of the FLINT/ML Compiler," in ACM SIGPLAN Workshop on Types in Compilation, Jun. 1997, pp. 1-10.

Stroustrup et al., "Multiple Inheritance for C++," Proceedings of the Spring 1987 European Unix Users Group Conference, Helsinki, 1987, 17 pages.

Tarditi et al., "TIL: A Type-Directed Optimizing Compiler for ML," In ACM SIGPLAN Conference on Programming Language Design and Implementation, (1996) pp. 181-192.

Wright et al., "A Syntactic Approach to Type Soundness," Information and Computation, vol. 115, No. 1 (1992) 49 pages.

* cited by examiner

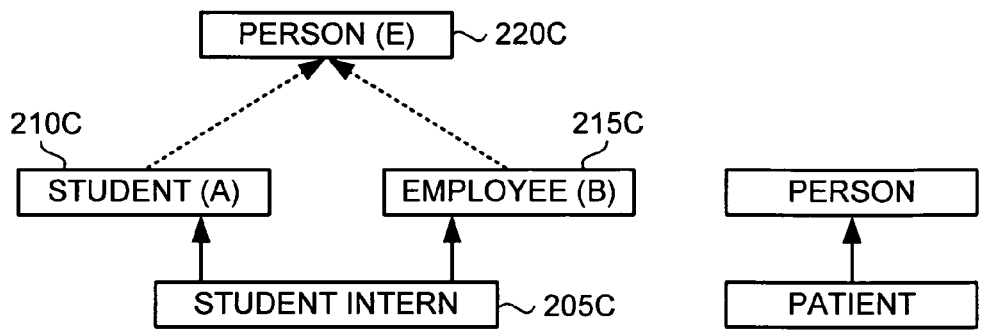
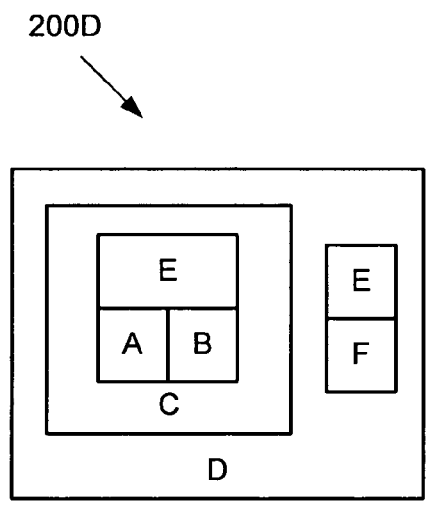
FIG. 2D
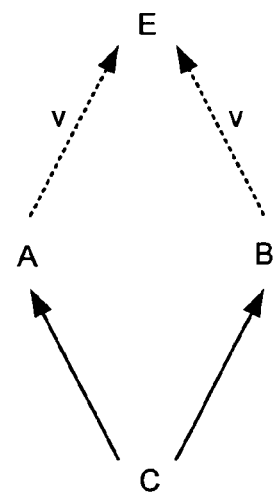
FIG. 2E
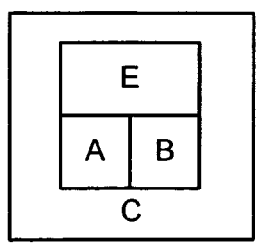
FIG. 2F

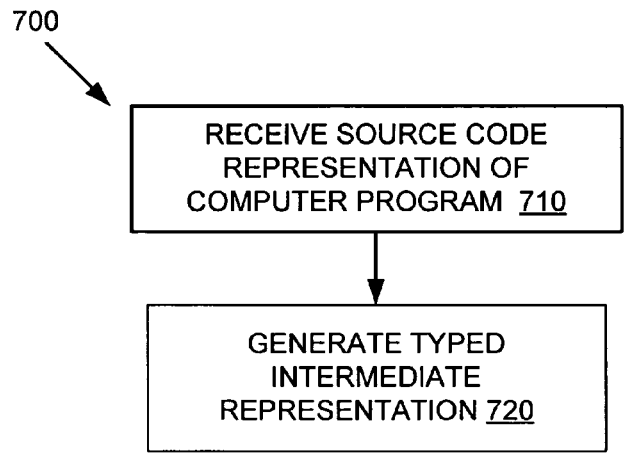
FIG. 7A
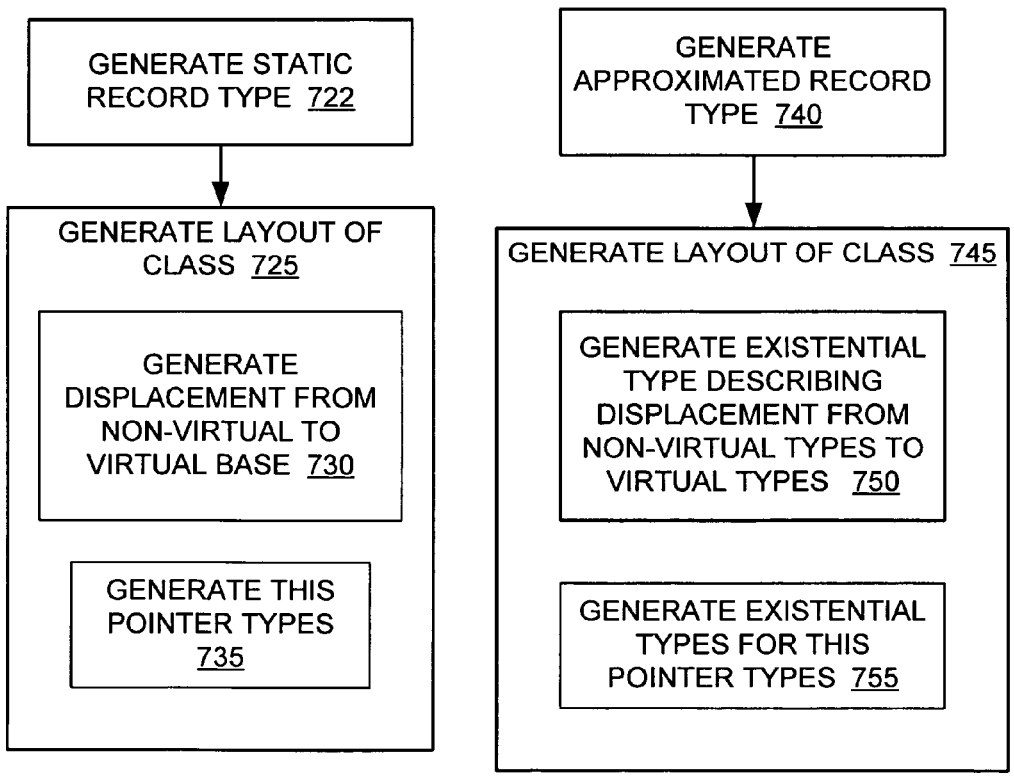
FIG. 7B
FIG. 7C

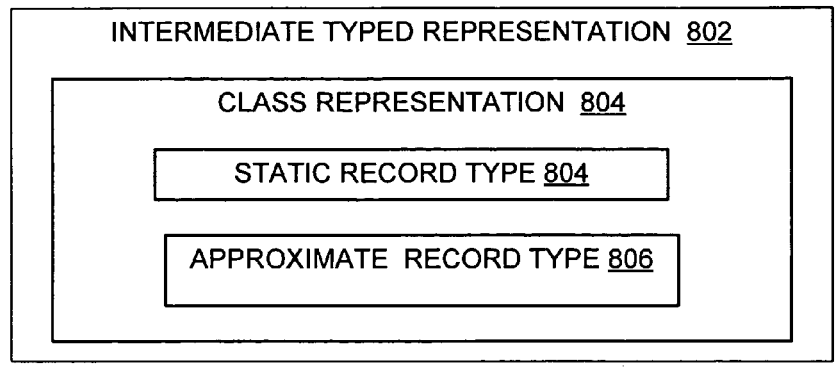

FIG. 8

$R(C) =$
$Ptr\{\{A:\{\{vtable:Ptr\{\{tag:Tag(C),$
$vbptr:Ptr\{\{E:Disp(A,VB::E,C)\}\},$
$m_A,m_C\},f_A\}\},$
$B:\{\{vtable:Ptr\{\{tag:Tag(C),$
$vbptr:Ptr\{\{E:Disp(B,VB::E,C)\}\},$
$m_B\}\}f_B\}\},$
$f_C,$
$VB:\{\{E:\{\{vtable:Ptr\{\{tag:Tag(C),m_E\}\},f_E\}\}\}\}\}\}$

FIG. 9

$ApproxR(P,\tau) =$
$Ptr\{A:\{vtable:Ptr\{tag:Tag(\tau),$
$vbptr:Ptr\{E:Disp(P::A,VB::E,\tau)\},$
$m_A,m_C\},f_A\},$
$B:\{ytable:Ptr\{tag:Tag(\tau),$
$vbptr:Ptr\{E:Disp(P::B,VB::E,\tau)\},$
$m_B\},f_B\},$
$f_C\}$

FIG. 10

Software 1280 Implementing Generation and Typing of Intermediate Language

TYPED INTERMEDIATE LANGUAGE SUPPORT FOR LANGUAGES WITH MULTIPLE INHERITANCE

CROSS REFERENCE TO RELATED APPLICATIONS

This is a continuation of U.S. patent application Ser. No. 11/332,818, filed Jan. 13, 2006, and entitled "TYPED INTERMEDIATE LANGUAGE SUPPORT FOR LANGUAGES WITH MULTIPLE INHERITANCE". This application is incorporated herein in its entirety.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

FIELD

The field relates to compiling computer programs to intermediate language representations. More particularly, the field relates to compiling object-oriented source code to typed intermediate language representations.

BACKGROUND

Compilers transform computer source code from high-level programming languages to machine code. A common method of compiler construction compiles the source code into an intermediate language, which is then itself compiled into object or machine code. Early compilers type-checked the source language during the initial compilation, and then threw away the type information, leaving the intermediate language untyped. But, maintaining type information within the intermediate compiler representation has significant benefits.

For instance, a typed intermediate language allows intermediate program representations to be themselves type-checked. Errors in the types found at the intermediate level can often be traced to compiler errors, and, thus, can be used to debug the compilers, an otherwise arduous task. Furthermore, the typed intermediate representations can often be more effectively optimized at the machine code level, and safety proofs for the underlying programs can be more easily created. Moreover, typed intermediate representations can be used as a format for redistributing programs, and a user can (mechanically) check that the program redistributed in the intermediate form is safe to run, as opposed to relying on certificates or third party claims of trustworthiness.

One reason that compilers for object-oriented languages have failed to adopt compilation using typed intermediate representations is that traditional class and object encodings have been seen as too complex to type effectively at an intermediate level. Even though work has been done for developing typed intermediate languages for functional languages, much of this work does not support object-oriented programming languages.

Thus far, those typed intermediate languages that have been proposed for object-oriented languages are complicated, often inefficient, and do not allow compilers to use standard implementation techniques. In short, they are not suitable for practical compilers. Furthermore, those typed intermediate languages which do exist do not support more complex object oriented behaviors such as multiple inheritance, and even more complex systems such as multiple inheritance using virtual base classes. With virtual inheritance, a shared copy of a superclass is allowed in a subclass object when the subclass inherits the superclass more than once.

A practical compiler requires simple, general, and efficient type systems. First, compiler writers who are not type theorists should be able to understand the type system. Second, the type system needs to cover a large set of realistic object-oriented language features and compiler transformations. Third, the type system needs to express standard implementation techniques without introducing extra runtime overhead. Fourth, the type system needs to support complex and powerful object oriented language components such as multiple inheritance using virtual base classes. To enable any of the above at the intermediate language level, methods and systems are needed to maintain type information in the intermediate language compiled from a source code representation.

SUMMARY

Described herein are methods and systems for generating typed intermediate representations of source code written in languages that allow multiple inheritance. In one aspect, the typed intermediate representations are generated using existential types to represent the possible paths from subclass objects to superclass objects within a class. In another aspect, the typed intermediate representations are generated using existential types to represent "this" pointers of methods and using special expressions to represent address arithmetic for necessary adjustment of "this" pointers in methods overridden by subclasses. In yet another aspect, at least one code portion of the typed intermediate representation comprises records which represent an object of a class when the runtime type of the object is known. These records, in an exemplary embodiment, reflect the actual layout of the object.

In another aspect, at least one code portion of the typed intermediate representation comprises records which represent an object of a class when the runtime type of the object is not known. These records, in an exemplary embodiment, reflect the inner non-virtual base objects of the enclosing object and include representations of offsets from subclass objects to virtual objects within their inheritance path.

In another aspect, at least one code portion of the typed intermediate representation can be checked for type correctness by only allowing objects with paths which are identical to the original object are allowed to call the method.

In yet another aspect, the typed intermediate representation faithfully models standard untyped implementations of multiple inheritance. Subclass objects can be cast to superclass objects by adding the offset from the subclass object to superclass object. If the superclass object is a virtual base, then the displacement from the subclass object to the superclass object must be fetched from a vtable. Similarly, casting from a superclass object to a subclass object is performed by subtracting the offset from the subclass object to the superclass object, if we statically know that the cast is valid.

The foregoing and other objects, features, and advantages of the invention will become more apparent from the following detailed description, which proceeds with reference to the accompanying figures.

BRIEF DESCRIPTION OF THE DRAWINGS

FIG. 2C is a block diagram illustrating an exemplary class hierarchy in an object-oriented language with virtual inheritance.

FIG. 2D is a block diagram illustrating a representation of the physical layout of a system corresponding to FIG. 2C with both multiple inheritance and virtual inheritance.

FIG. 2E is a block diagram illustrating a representation of the class hierarchy of a system corresponding to a portion of FIG. 2C.

FIG. 2F is a block diagram illustrating a representation of the physical layout of a system corresponding to a portion of FIG. 2D.

FIG. 7A is a flow diagram illustrating an exemplary method of generating a typed intermediate representation of a computer program, the computer program having notions of virtual inheritance and multiple inheritance.

FIG. 7B is a flow diagram illustrating an exemplary method of generating an exact type according to the method of FIG. 7A.

FIG. 7C is a flow diagram illustrating an exemplary method of generating an approximated record type according to the method of FIG. 7A.

FIG. 8 is a block diagram illustrating an exemplary typed intermediate representation of a computer program.

FIG. 9 is an exemplary layout for an object whose runtime type is known to be a class with virtual inheritance in an exemplary typed intermediate representation.

FIG. 10 is an exemplary layout for an object whose runtime type is a subclass of the class in FIG. 9 in an exemplary typed intermediate representation.

DETAILED DESCRIPTION

1. Overall System for Type-checking Intermediate Representations

Figure 1:
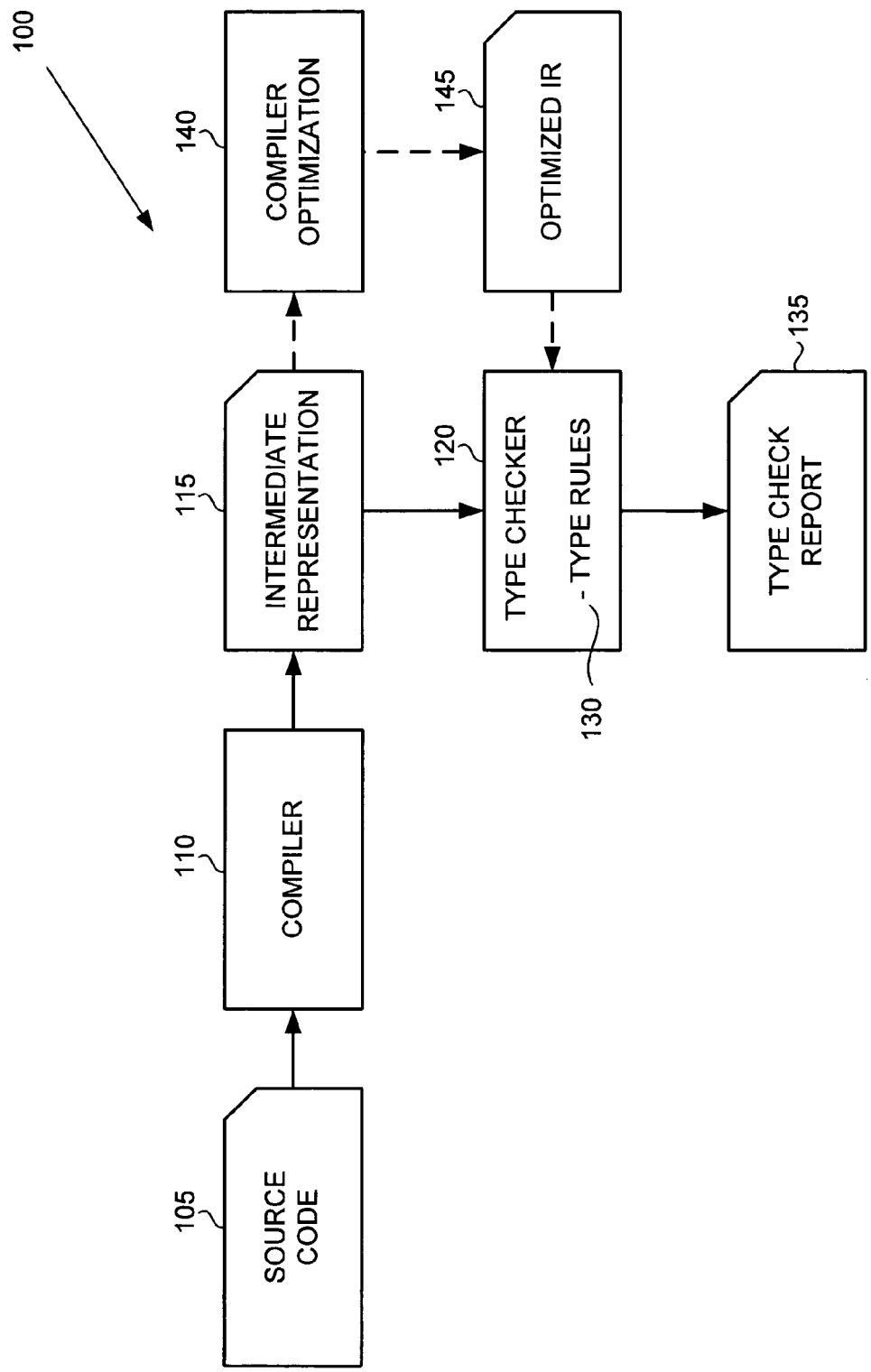
FIG. 1 is a block diagram illustrating an exemplary system for generating a typed intermediate representation of a computer program from its source code representation in an object-oriented language.

FIG. 1 illustrates an exemplary overall system 100 for type checking typed intermediate representations of computer code. The system 100 comprises a compiler 110 for compiling a source code representation 105 in an object-oriented language to a corresponding typed intermediate representation 115. The system 100 further comprises a type checker 120, which performs type check analysis of the typed intermediate representation 115. The type check analysis performed by the type checker 120 is according to the type checking rules 130 which are applied to the typed intermediate representation 115. The result of the type checking analysis may be expressed as a type check report 135. Among other things, the type check report 135 may comprise an answer to whether or not portions of code in the intermediate representation 115 have violated one or more typing rules 130. The rules 130 are, in part, expressed in the form of constructs in a typed intermediate language that preserves the notions of class names and class hierarchies declared in the source code representation 105. Furthermore, the intermediate language provides typing for internal object constructs such as vtables, virtual base pointers, and methods.

Alternatively, after an initial compilation from the original source code representation 105 to an intermediate representation 115, the compiler optimization processes 140 can be applied to the intermediate representation 115 to further streamline the original source code 105 according to particular target architectures, for instance. Nevertheless, applying the optimizations 140 results in an optimized form 145 of the intermediate representation 115, which can also be type checked by the type checker 120. In fact, without a typed intermediate representation 115, verifying the type safety of optimizations 140 would be difficult and, in some cases, would create unwanted overhead during runtime. The dashed lines connecting optimizations 140 and optimized form 145 of the intermediate representation 115 to the type checker 135 indicate that optimizations 140 are not required to be applied to the intermediate representation 115 prior to type checking.

Also, FIG. 1 shows a single intermediate representation 115. However, it is possible to have more than one intermediate representation, such as the one at 115, prior to lowering the program in question to its machine code representation. The principles of the typed intermediate representation described in additional detail below can be applied to any such intermediate representations and any number of such intermediate representations (e.g., 115 in FIG. 1).

Figure 5:
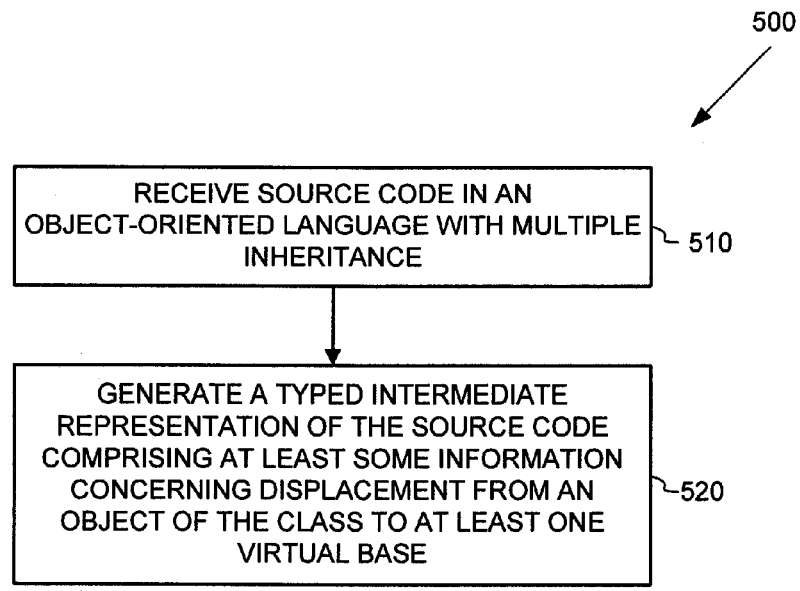
FIG. 5 is a flow diagram illustrating an exemplary method for retaining virtually inherited class information in a typed intermediate representation of a computer program.
Figure 6:
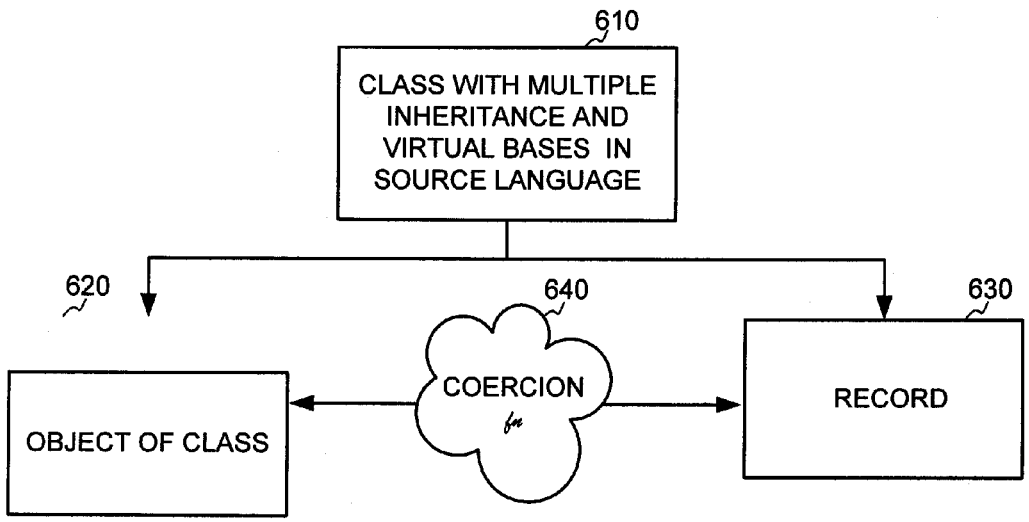
FIG. 6 is a block diagram illustrating coercing between exemplary objects and records in a typed intermediate representation of a computer program.

2. Exemplary Method of Compiling a Source Code Representation of an Object-oriented Language to a Typed Intermediate Representation One way to make typed intermediate representations for multiple inheritance, such as 115 (FIG. 1), is according to the method 500 of FIG. 5, wherein at least some of the information is preserved for the layout of at least some of the inherited objects including implementation details, which in an exemplary embodiment include vtables, virtual base pointers, methods, "this" pointers, and fields. The class hierarchy, including classes with multiple inheritance and virtual inheritance as represented in the source code 105 (FIG. 1), is, likewise, preserved.

One important feature of the typed intermediate representation is that it represents the displacement from a class to at least one virtual superclass of that class. With reference to FIG. 2E, C is a class which inherits classes A and B. Class A and class B both inherit class E virtually, as represented by the dotted lines from A and B to E. This corresponds to the example shown in FIG. 2C, where the student intern class 205C inherits both the student class 210C and the employee class 215C, both of which virtually inherit the person class 220C.

Each object of these classes has data stored within. A representation of the object is stored in some location on a resource such as on a file or in memory when the program is compiled. Data is then stored in this representation when the program is run. Typing protects data when it is initially compiled from being accessed incorrectly by only allowing objects with the correct class to access fields that represent the data. The intermediate representation represents the actual layout of the physical structure of the objects and prevents data fields from being incorrectly accessed by only allowing objects of the correct type to access a representation of the actual storage locations.

Virtual inheritance and multiple inheritance add complication to the process of typing objects in an intermediate representation. When a class inherits a number of super classes, the various members of the class are generally at known offsets. However, when classes include virtually inherited members, the offsets become much more complex because although, in our continuing example of class C, both A and B inherit E, the child E cannot keep the offsets from both parents A and B at the same time.

In object-oriented languages, subclass objects are allowed to use methods of their superclass objects without explicitly casting the type to the specific class type method that is used. To further complicate matters, because there is multiple inheritance, there may be more than one inheritance path from a subclass to a superclass. Furthermore, the actual inheritance path that an object will take may not be known until runtime. Each different inheritance path may require a different offset from the subclass object to the super class object at runtime. There is a set of valid subclass-to-superclass object casts. The typed intermediate language captures both the actual offset of virtual objects from their subclass objects and captures the valid set of subclass-to-superclass paths (representing offsets in the resource object state) from subclass objects to super class objects.

3. Object-Oriented Language Overview

A. Classes

In object-oriented programming, programs are written as a collection of classes. Classes are composed of their superclasses, their own data fields, their own methods, and the data and methods of their superclasses.

An instance of a class is an object. Each method in an object has an associated this argument. The this argument is a pointer to the individual object for which the method is being called.

The use of classes allows the underlying programs to encapsulate data, exhibit polymorphism, and allow inheritance. Data encapsulation can also be thought of as data hiding. Classes hide their internal composition, structure and operation. They expose their functionality to client programs that utilize the class only through one or more interfaces. An interface defines the actual methods with their data types that a class uses to interact with client programs. However, the implementation of the class is defined separately and generally cannot be modified by a client program through the interface.

The advantage of using data encapsulation comes when the implementation of the class changes but the interface remains the same. For example, a method to sort members of an array may be replaced internally with a different, more efficient sort. If the interface does not change, then code which utilizes the sort will still be valid.

Figure 2A:
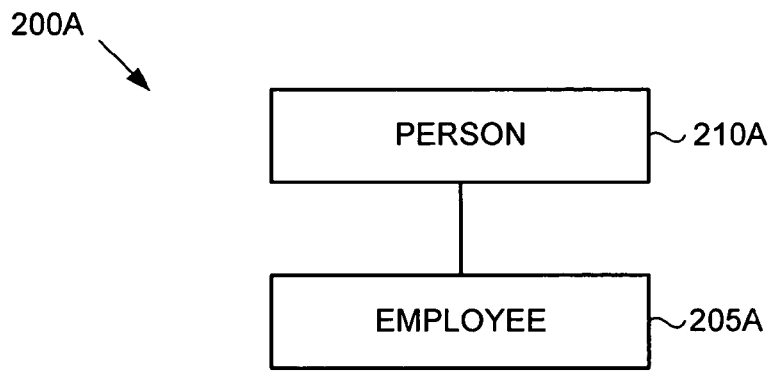
FIG. 2A is a block diagram illustrating an exemplary class hierarchy in an object-oriented language.

Inheritance allows classes to easily share common features. A child class (also known as a derived class ) inherit the properties of its parent (base) class, and is free to add features if its own. This allow classes to share common features. For example, FIG. 2A shows an inheritance diagram for two classes, Employee 205A, and Person 210A. The Person class 210A may have fields such as "age", and "address". An Employee class 205A may share features with an existing Person class 210A, while adding a few features of its own, such as "employee number", "hourly wage", "office location", etc. One way to implement the Employee class 205A is to derive it from the Person class 210A. Employee 205A will then inherit all of the methods and data members from Person 210A. The original, parent class, Person 210A is called the base class of the derived child class, Employee 205A. Furthermore the base class (Person 210A) is known as a superclass of the derived class (Employee 205A) which in turn is a subclass of the parent class Person 210A.

Polymorphism is the ability for different types of objects to invoke the same method and have the method produce the appropriate different results. The classic example is "area." A base class "shape" can have different derived methods (such as "rotate", "changecolor", etc.) for different shape classes, such as "circle" "square", "triangle", etc. The same rotate method can then be applied to any shape object and return the correct results. The base class does not need to know, and often doesn't know, the type of the object that invokes the method until runtime. This is called dynamic binding.

B. Multiple Inheritance

Multiple inheritance allows a class to inherit the same class more than once. This is useful when a class has two or more sets of behavior a class should require. For example, with reference to FIG. 2B, inheritance diagram 200B represents multiple inheritance for a Student intern class. A Student intern 205B might share features with both a Student class 210B, such as a "major", the number of credit hours passed, etc. and an employee class 215B such as "hourly wage". Most easily, this can be represented by the Student intern class 205B inheriting the features from the Student class 210B and the Employee class 215B. Since Student 210 inherits from the Person class 220B and Employee 215B inherits separately from the Person class 225B, student intern 205B inherits two separate instantiations of the Person class 220B, 225B.

To prevent this unnecessary duplication, some languages that have multiple inheritance allow two different types of inheritance, nonvirtual and virtual. With nonvirtual inheritance, the child class contains a copy of each of the members of the inherited class, as well as copies of its own members. Therefore, when a class inherits from the same nonvirtual base class more than once, objects of that class will contain multiple copies of the data members of same multiply inherited subclass, such as the example of Student Intern 205 inheriting two copies of the Person class 220, 225.

Alternatively, a virtual base class can be inherited more than once without duplication of its data members. Each object has only one copy of a virtual base. FIG. 2C shows a representation of the class hierarchy of the Student Intern class when Person is virtually inherited. Classes Student 210C and Employee 215C now use class Person 220C as a virtual base class, indicated by the dotted lines from Student 210C and Employee 215C to Person 220C. Class Student Intern 205C use classes Student 210C and Employee 215C as direct base classes. Class Person 220C is an indirect base of class Student Intern 205C. As can be seen, there is only one copy of class Person 220C. More specifically, class Person 220C is a virtual base of class Student Intern 205C if Student Intern 205C or one of Student Intern 205C's super classes has a direct virtual base Person 220C. The same class can be both a virtual and a non-virtual base. FIG. 2D shows a representation of the physical layout of a system corresponding to FIG. 2C with both multiple inheritance and virtual inheritance. Class D inherits class C, which inherits classes A and B. Both A and B inherit virtually E. Therefore, there is only one E class in the C inheritance block, even though E is inherited by two separate classes, A and B. D also inherits class F, which in turn inherits non-virtually E. In this instance, E is a virtual base of D, through D's inheritance of C, and a non-virtual base of D, through D's inheritance of F. Each D object has only one shared copy of the virtual base E, but has a separate copy for each non-virtual inheritance of E.

C. Inner, Outer, Innermost, and Outermost Objects

At runtime, instances of a class are known as objects. An object whose type is an inherited superclass of a class is referred to as an inner object or as an enclosed object. In FIG. 2D, C is a inner object of D, as are F, A, B, and both E's. A and B are inner objects of C, while E is an inner object of F, A, and B. The enclosing object is called an outer object, from the point of view of the inner objects. Therefore, C is an outer object of D, and F is an outer object of its copy of E. Objects that do not contain inner objects are innermost objects. E is an innermost object, both with relation to A and B, and with relation to F. Objects that are not inner objects of any other objects are outermost objects, or complete objects. D is an outermost, complete object. Each object that is an inner object can be considered embedded in its outer object or objects.

4. Exemplary Path Representation

Exemplary embodiments represent path in a different way than the "path" in, for example, the C++ source language. This path notion is more explicit and complete, in the sense that it describes the whole path from the outermost object to each inner object. Each object is associated with a path (either concrete or abstract). Concrete paths are paths for those objects whose runtime type is known at compile time. For objects whose runtime type is known only at runtime, an abstract path is provided. Providing the path allows differentiation between different copies of the same super class in a subclass object. C++ paths do not need to start from the outermost object. As another difference, C++ does not have abstract paths. Among other differences, C++ paths do not use an explicit identifier, such as "VB" to identify virtual bases, and do not lift virtual bases to the top level.

A path, in an exemplary embodiment is a sequence of class names that represent a way, at runtime, from an outer object to an inner object. This is called an inheritance path. In languages that allow multiple inheritance and virtual bases, the path that may be taken from an outer to an inner object, may only be fixed at runtime—that is, it may be bound dynamically. For example, and with continuing reference to FIG. 2D, if we are given an object of E, we cannot tell if it is a bare E object, or an inner object inside another object, such as the E's enclosed within the D object (FIG. 2D.) Each of these different E objects has a different path which can only be fixed at runtime. Paths determine what methods can be called on those E objects. For example, an E method overridden by D cannot be called on a bare E object, because the method may access D's members. Thus, ensuring type safety of a method call on an object can be a challenge, particularly when, at compile time, it is not known whether the object is of a particular class or one of its sub-classes. Using paths as types guarantees the safety of dynamic dispatch.

Paths are defined as follows: a path is a sequence of class names that represents a way from an outer object to an inner object, as shown above. The letters P and Q will be used to range over paths. $\epsilon$ will be used to represent an empty path. P:(D, E] represents a path P of the form D:: ...:: ... $D_n$::E that starts at D exclusively-exclusivity is indicated by the "("— and ends at E, inclusively-inclusivity is indicated by the "]"— where all bases are non-virtual bases. Abstract paths are represented by path variables. A path variable $\rho$:($\tau$, A] abstracts all paths from $\tau$ to A where $\tau$ represents the runtime type of an object which might be unknown at compile time.

The pseudo-class name VB is used to lead paths from an outermost object to an inner object of a virtual base. Paths for inner objects of a virtual base class E are compressed to VB::E. There is only one copy corresponding to the virtual base class E. Thus we do not need to track the intermediate classes. In the example given just above, with reference to FIG. 2D, the E object corresponding to the virtual base E is represented by the path VB::E, instead of C::A::E or C::B::E. The pseudo name VB is necessary to distinguish virtual and non-virtual inheritance if a super class is inherited both virtually and non-virtually.

FIG. 2F represents a class C, a subset of the class shown in 2D, which inherits A and B. Each of these two super classes virtually inherits E. One of the many ways type is preserved is that the type of an object (such as E in FIG. 2E) is considered to be the path that starts from the actual runtime type of the enclosing object (such as C in FIG. 2E) and ends with the actual object, with all of the intervening objects represented, as well.

The type Path(P, $\tau$) represents object with actual runtime type $\tau$ and path P that starts form $\tau$ and leads to the object. Type Path($\epsilon$, C) represents complete C objects which are not embedded within any other object. The record type R(C) (discussed below) represents the layout of the complete objects.

More specifically, paths are sequences of class names that uniquely identify embedded objects. A path P lists all intermediate classes between two classes $\tau_s$ and $\tau_e$ where $\tau_s$ is a subclass of $\tau_e$. P, specifically, can be thought of as a path from $\tau_s$ to $\tau_e$.

The "this" pointer of a method has an associated path, as it points to an object. Calling a method m on an object o is implemented as first fetching m from o's vtable and then passing o to m as the first argument (the "this" pointer). Here, the "this" pointer of m is given the same path as o. The type checker requires that only objects that have the same path as o can be passed to m as the "this" pointer. This prevents unsafe dispatch where objects with incompatible types are passed as "this" pointers.

5. Object Layout

Figure 3:
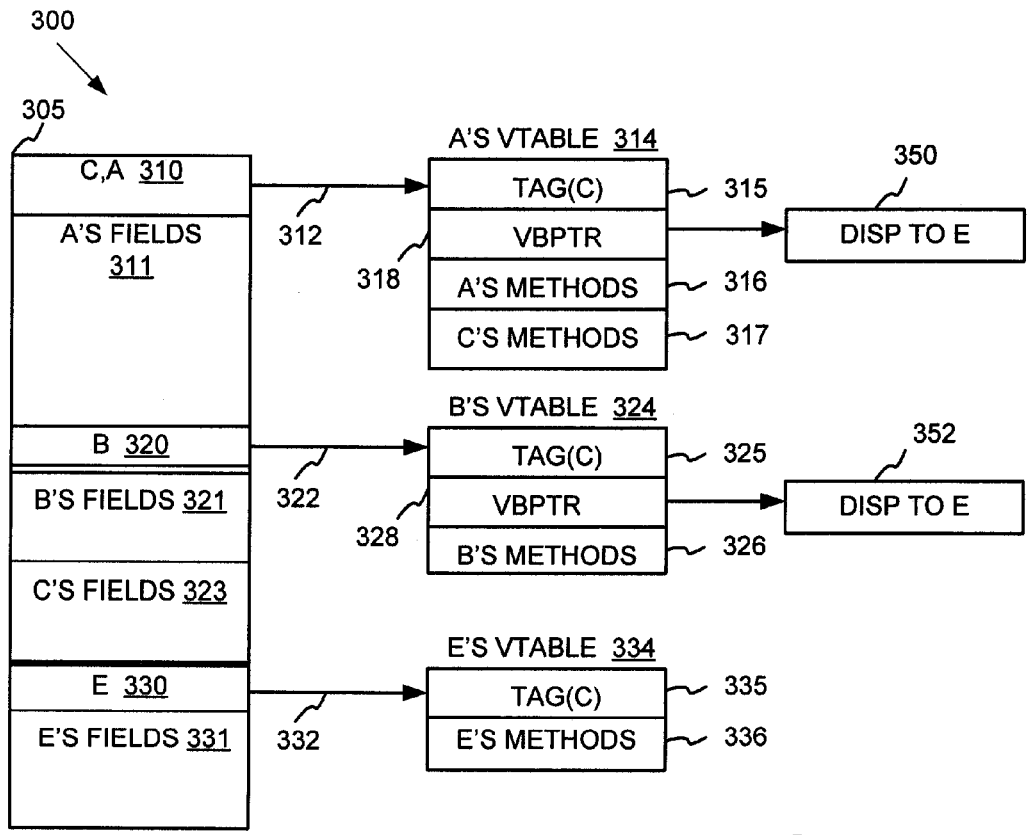
FIG. 3 is a block diagram illustrating an exemplary object layout represented by an exemplary record type in the typed intermediate representation.

In object-oriented languages, the objects of subclasses can be viewed as objects of the superclasses. So, Student intern object (205C of FIG. 2C) can use the Employee object (215C of FIG. 2C) field "hourly wage", for example. Similarly, an Employee object can use the Person object (220C of FIG. 2C) field "address". FIG. 3 shows an embodiment of an object layout 300 of class C defined in FIG. 2D. The vtable 314, 324, 334 is a container for the methods for a specific class including the methods inherited from some superclasses.

Object layout for objects whose runtime types are classes with multiple inheritance is more complex than for objects whose runtime type are classes with only single inheritance. When classes inherit singly, then all inner objects can share the starting address and vtable with the outermost object.

Objects whose type is a class with multiple inheritance need multiple vtables, as some inner objects must have different addresses than the outer ones that are not in a single direct line of inheritance. So, turning to FIG. 2D, presumably, D, C, and A are in a direct line of inheritance and so could share a vtable, but all the other objects need their own vtables. Calling methods in those non-direct line inner objects on the outer objects requires adjustment of the "this" pointer to point correctly to the inner objects.

Figure 2B:
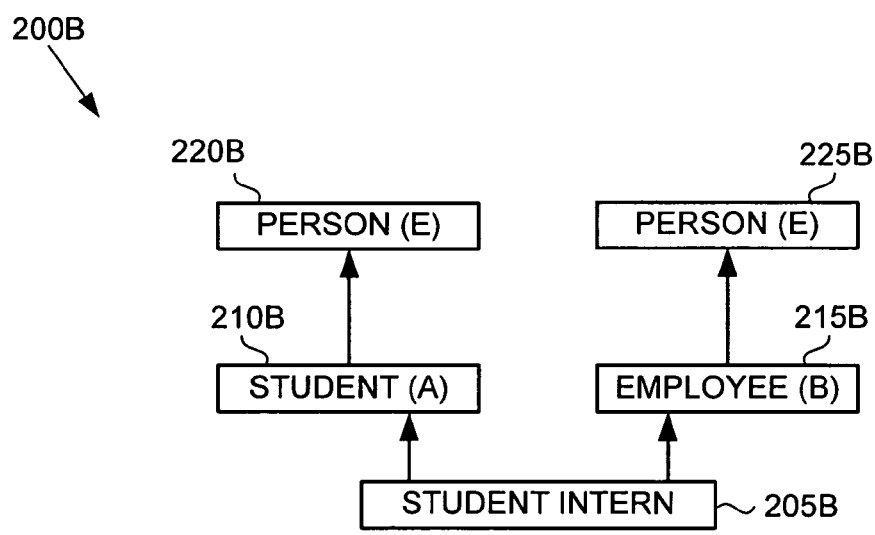
FIG. 2B is a block diagram illustrating an exemplary class hierarchy in an object-oriented language with multiple inheritance.

If a subclass C overrides a method in a super class B, such as a Student intern class (205B in FIG. 2B) method "minimum wage" overriding an Employee class (215B in FIG. 2B)

method "minimum wage", the overridden method in C expects a C object at runtime. Because of multiple inheritance, a C object 310 may have an embedded B object 320 that has an offset from the C object. Thus, when the method on the embedded B object is called, we have to adjust the B object to point to the beginning of the C object and call the overridden method in C.

Virtual inheritance further complicates object layout. Consider the system of C, A, B, and E in FIG. 2D, whose layout is shown in FIG. 2F. Class A and B both virtually inherit E, while Class C inherits A and B. Each A object and B object contain an E inner object, but because E is virtual, only one copy of E is actually stored.

With virtual inheritance, the displacements from classes to their virtual bases may change in subclasses (the "B" class and A class each have different offsets to the "E" virtual class in FIG. 2D), and therefore must be computed at run time.

FIG. 3 shows an exemplary object layout for an object of type C illustrated in FIGS. 2D, 2E, and 2F. An object of C contains inner objects (A 310, and B 320) for C's direct non-virtual bases in the order specified in C's declaration. Each of these objects contains the fields that it introduces: A's fields 311 and B's fields 321. After all of the non-virtual bases have been declared, the fields 323 that the object C introduces are placed. Then, the inner objects for all of the object C's direct and indirect virtual bases are placed. Each virtual base of both direct and indirect types has its own inner object. In the exemplary embodiment, the virtual base E 330 is placed after C's fields 323. The order of the inner objects for non-virtual bases and C's fields is fixed, even in the subclasses of C—in the example, A 310 and B 320.

However, the inner objects for virtual bases (E 330) are floating—their locations may vary within C and each of C's subclasses, and therefore need to be calculated at runtime. Each inner object may have sub inner objects of its own if the corresponding class has non-virtual bases.

Only the innermost objects have vtables as their first fields. B is an innermost object. The outermost object (C) shares its vtable with its first non-virtual base (A), and so on.

Each inner object for C, that is, A, B, and E, have their own vtable 314, 324, 334. The C object 310 shares the starting address 305 and the vtable 314 with the A object 310. The vtable record also contains class-specific information used to identify the (outermost object) class—a runtime tag. For example, the vtable for A (an inner object of the C outer object) has a tag for C, "TAG(C)" 315. The other inner objects within C also have tags for C as well, 325, 335. Each vtable of class C 314, 324, 334, contains a runtime tag 315, 325, 335 that identifies C, and allows the inner object to call the overridden method in the outer object. Each inner object (such as B 320) needs its own vtable to use as an ordinary object. For example, an inner object may have its own methods 316, 326, 336, pointers to which are stored in the vtable.

The inheritance relationship for virtual bases is not mapped directly in the actual object layout for two reasons, one obvious, one not so. Because multiple object inherit the same virtual base, and since there is only one virtual base, different objects must be at different locations (offsets) from the virtual base. Also, virtual superclasses inheritance relationships are "flattened" in the sense that, if class C inherits A (virtually or not) and A has a virtual superclass E (as can be seen, for example, in FIG. 2E), then the C object does not physically embed the virtual superclass E in the A object, as would be expected from the relationship hierarchy, but instead stores the virtual superclass E object at the top level, as can be seen in FIG. 3, where the E object 330 is stored at the same level within the C object 300 as the A object 310. However, in spite of the virtual object being lifted up a level, it is still considered as an embedded object of the C object. If E itself had a virtual base Eprime, then Eprime would also be at the top level, and not contained within the E object. Paths that involve virtual bases must represent this flattened structure. To do so, the pseudo class name VB is used to differentiate virtual superclasses from non-virtual ones. All VB classes are at the top level of the object, which follows the flattened representation of virtual bases in the actual object layout.

Because the VB classes are at the top level of an object, rather than in the position they would appear to be by looking at the actual inheritance, some paths that appear to exist actually do not. For example, although the paths to E from C in the source code object hierarchy shown in FIG. 2F make it appear that there are two possible paths; C to A to E and C to B to E, as E is stored internally at the same level as A and B; there is actually only one path C to E, represented as VB::E, keeping in mind that when VB begins a path name it is assumed to begin at the outermost object (C) of the virtual base (E), and so represents the path from C to E with no intervening (A or B) objects.

Each object needs its own way to locate the inner objects for virtual bases, as offsets between subclass objects and virtual superclass objects may vary, depending on subclass objects and actual runtime types of the objects. If a subclass inherits a virtual superclass more than once, such as E, there are not multiple copies of E, rather, each inheritance of E shares the same object. With reference to FIG. 2F, A and B both share the same E. In C objects, A and B cannot both preserve the offsets to E because there is only one object E. In subclasses of C, the offsets might change again. Therefore, the offset can only be determined at runtime.

One standard solution is to have the displacement stored in connection with the vtable for each superclass object. A standard solution for storing these displacements is to give each class with virtual bases a "virtual base table pointer" (vbptr) in its vtable. The pointer points to a table that lists displacements from an object of the class to all of its direct virtual bases. So, if an object directly virtually inherits four classes, then there are four entries in vbptr.

To return to FIG. 3, as an example, to go from the A object 310 to the E object 330 at the runtime level the following steps will occur: 1) the vtable 314 of the A object is fetched, 2) the vbptr 315 out of the vtable 314 is fetched, in some exemplary embodiments, always at a fixed offset, then 3) using the vbptr 315, the offset (or the displacement) from A to E 350 is retrieved. 4) Now that the offset from A to E is known, the pointer that points to A is added to the offset from A to E 350, and we get a pointer to the E object. Only classes that have direct virtual bases need to store such offsets. To get to indirect virtual bases, we can first cast objects to proper superclasses. For example, to get to an E object from a C object, we can cast the C object to A and fetch from A's vtable the offset from A to E.

Not all offsets within vbptr are from non-virtual superclasses to virtual classes. The offsets can be from virtual bases to their virtual bases. For example, if A is a virtual super class of C, while all other relations remain unchanged, the vtable of A will have a vbptr that contains the offset from A to E.

In another approach, each object of a class which inherits virtual bases contains a vbptr which points to the vtable of the class. The vtable itself is a pointer to a set of offsets, each offset corresponding to a virtual base superclass object. To get the E virtual base object out of the C object, first the vbptr is fetched from the C object which points directly to the vtable. Once at the vtable, then the appropriate entry for E is located.

This entry points to the offset between the E object and the C object. Once the offset is known, it is added to the C object.

As another embodiment, rather than storing the offset from each virtual base object associated with an outer object in a vbtable, a pointer to the beginning address of the virtual base object can be stored directly in methods associated with the outer object.

6. Exemplary Record Types Related to Class Layout

Typical object-oriented languages allow classes and subclasses to be used interchangeably. Subclass objects can be used as super class objects. A class name represents objects of itself and its subclasses. In fact, this is seen as one of the strengths of object-oriented code. However, in the exemplary typed intermediate representation, class names refer only to the class themselves, and not to any subclasses because the representation has notions to represent precise runtime types to guarantee safety of dynamic dispatch. Interestingly enough, this means that quite possibly the intermediate representation is typed with more precision than the original source code.

Runtime object layouts in a typed intermediate representation are expressed in two record types. These two record types are shown in FIG. 9 and FIG. 10. Exact record type 900 represents complete C objects, which are known at compile time to have class C as their runtime type. In an exemplary embodiment, this exact record type is known as R(C). The second record type, the approximated record type 1000 represents C objects whose runtime type is not known until runtime.

A. Record Types

The two record types, exact 900 (from FIG. 9) and approximated 1000 (from FIG. 10), are used to describe the layout of an object which may have both virtual and multiple inheritance. The exact record describes objects of the class whose runtime type is known at compile time, where the approximated record represents objects of the class whose type is not known until runtime.

The exact record type 900 describes the layout of a complete object C, including, in an exemplary embodiment the inherited classes (both virtual and non-virtual) and their vtables, vptrs, methods, and fields. This layout at least partially maps to the actual layout of the object C in a compiled representation of the computer program. Many of the features within exact record type 900 (such as, for example, the vtable, vptrs, and methods, in an exemplary embodiment) are themselves typed. For example, the exact record type 900 (known as R(C)) for Class C as defined in FIG. 3 types a number of internal features, as discussed below. Only complete objects have an exact record type 900.

The labels A 902, B 906, and E 908 identify inner objects corresponding to the A 310, B 320, and E 330 objects shown in FIG. 3. The A field 902 in R(C) 900 describes the layout of the A non-virtually inherited inner object in an enclosing C object as shown in FIG. 2F. The braces "{{" and "}}" indicate that an "exact" record is being defined: only fields within the braces occur and must occur in the order specified. The vtable of the A object 904 is described in the record (which amounts to typing it), including its vbptr 913. The vbptr 913 points to (and by its definition types) the displacement of each virtual base 910 from A 902. The displacement from A to E is represented by "Disp(A, VB::E, C)" 910. This displacement form, generalized as "Disp($Path_1$, $Path_2$, C)", represents the displacement from an inner object following $Path_1$(A) to another object following $Path_2$ (the virtual base E) in the outermost object (C). The displacement 912 in the B 106 object is written similarly, only the first field, $Path_1$, is replaced by "B", indicating that the displacement is from B to E. In the actual intermediate typed representation, this displacement field is an actual offset from the inheriting object to the inherited virtual base, that is, in the exemplary example, A to E or B to E in C. The offset found in the R(C) table 900 can then be used to physically locate virtual base objects (the E object) when at subclass objects (the A or B object).

The methods of each of the bases are placed within the record at the same location that they occur within the actual object structure. For example, the methods for A 914 occur after the vbptr table for A 913, just as in the actual structure, as shown in FIG. 3. Similarly, the methods for B 916, the fields (data) for B 920, the tags for the outer object, such as the tag for C found in E 922, and. so on, also occur in the same order as found in the actual physical C runtime object (as shown at 300 in FIG. 3).

All virtual bases must be top-level fields in R(C), as has been described above, representing the flattening of the virtual base superclasses. So, with reference to FIG. 2F, for example, neither A nor B can have virtual base (VB) subfields even though virtual base E is a superclass of both A and B. Non-virtual base subfields are allowed, and, in fact, required if top-level objects themselves belong to class types which inherit other classes. So, for example, if a class A both virtually inherited a superclass B and non-virtually inherited the same superclass B, there would be two entries in R(C) 900 for an object of that type, one of them the virtually inherited, indicated by the label "VB" and located as a top-level field, and one, the non-virtually-inherited one, without the VB label, located where it belongs within the object hierarchy.

An exemplary embodiment uses path types to represent objects. These explicit notions of runtime types and paths guarantee the soundness of dynamic dispatch, as the type checker guarantees that only objects with allowed runtime types and paths can be passed to methods as "this" pointers at runtime.

B. Approximate Record Types

Class types are imprecise, deliberately, in object oriented programs, due to polymorphic nature of object oriented languages. An object with, for example, Class type C may be a C object or a C inner object in a subclass of C. For example, a student intern class 205C of FIG. 2C can transparently invoke a method in the inner object Person 220C of FIG. 2C, such as "age". However, dynamic dispatch requires precise types. That is, we must be able to determine if the runtime type of the object passed to a method matches the "this" type of the method to determine the soundness of the program. For example, if a method m is fetched from a C inner object following a path P in a subclass object, it is dangerous to pass a complete C object as the "this" pointer to m, as a subclass of C may override the method with implementations referring to members only in the subclass but not in C itself. Therefore, a way of representing the potential paths is needed.

For most objects we know neither the runtime type nor the path, but we still need to describe the path that is taken to reach this object. Then, we can match the paths of "this" pointer in the method and of the object passed to the method.

An exemplary embodiment uses an existential type with path abstraction to represent the possible runtime types and paths for a specific object. Exemplary source languages generally allow classes and subclasses to be used interchangeably even though the precise type—the runtime type—is dependent on the execution path, which becomes evident only at runtime. In a typed intermediate representation provided with precise notions of class names, such as this one, the loose reference of source code class-names (allowing a subclass object to access a superclass object method using the subclass name) cannot be used to refer to the types of objects that are classes or their subclasses. Instead, in generating the intermediate representation, a bounded existential type $\exists\alpha<<C.\exists\rho:(\alpha,C]$. Path$(\rho, \alpha)$ binds a type variable $\alpha$ to abstract the runtime type of an object which is not known at compile time. It represents all C objects, complete or embedded. The type variable a identifies the runtime type of the outermost object, which must be C or a subclass of C. The "<<" indicates the subclass relationship, so that C<<B indicates that C is a subclass of B. The variable $\rho$ abstracts the path from the outermost object (identified by $\alpha$) to the C inner object. If we follow $\rho$ in the $\alpha$ object we will get to a C object.

An exemplary embodiment of the approximated record type ApproxR(P, $\tau$) is shown in FIG. 10. ApproxR(P, $\tau$) 1000 describes the approximated layout of objects with runtime type $\tau$ and path P, where P and $\tau$ might be unknown at compile time. P is a path whose starting point is $\tau$ and whose ending point is C. This record type can be thought of as describing the layout of C inner objects following the path P.

The ApproxR(P, $\tau$) record 1000 contains descriptions of a class's non-virtual bases 1002, 1014, and excludes the class's virtual bases. Referring to the exemplary illustration FIG. 3, the ApproxR(P, $\tau$) 1000 record contains descriptions of the non-virtual bases A 1002 and B 1014, including type descriptions of their vtables 1004, 1016, vbptrs 1007, 1028, and methods 1006, 1029. As can be seen, the virtual base E is omitted from the ApproxR (P, $\tau$) 1000 record type. This is because the virtual base E cannot be directly accessed at a constant offset in the C inner objects. However, the vbptrs 1007, 1028 still have offsets to the virtual base E. For example the vbptr in A 1007, gives the displacement to E 1008, when the path P is not known. It reads:

vbptr: Ptr{E: Disp(P::A, VB::E, $\tau$)} 1008;

This displacement form, generalized as Disp(Path$_1$, Path$_2$, $\tau$), represents the displacement from an inner object following Path$_1$ (A) to another object following Path$_2$ (the virtual base E) in the outer object ($\tau$). The character $\tau$ is a stand-in for the actual runtime type—a type variable. This details the offset between the A inner object and the virtual base type E inner object in $\tau$, the actual runtime type.

As with the exact record type 900, the ApproxR type also describes the actual layout of the object in question (in an exemplary embodiment, C) as can be seen by the location of the methods 1006, 1028, which are in the same location as the methods in the actual runtime representation of the object 316, 326. Similarly, A's fields 1012 and B's fields 1024 are in the same location as in the actual runtime object of C 311, 321 (in an exemplary embodiment).

Objects can be coerced to records, and vice versa. If an object has runtime type C it can be coerced to a record of the exact record type R(C) 900. Objects whose source type is C (complete C objects or embedded C objects in C's subclass objects) are translated to have type "$\exists\alpha<<C.\exists P:(\alpha, C]$. Path $(P, \alpha)$" in the typed intermediate representation. These objects can then be opened to get objects of type "Path$(P, \alpha)$". Objects of type "Path$(P, \alpha)$" can then be coerced to and from records of type ApproxR$(P, \alpha)$. These coercions are runtime no-ops, and thus, introduce no overhead at runtime. Creating new objects is done by first creating new records and then coercing the records to objects. Fetching fields out of objects is done by first coercing objects to records and fetching fields out of the records.

The two records, the exact record type 900 and approximated record type 1000 need to understand, and therefore map, the layout that the compiler chooses for the objects. Therefore, the exemplary embodiment above indicates only one possible implementation for the compiler, and, hence, the layout of the exact record type R(C) 900 and approximated record type 1000. It should be remembered, however, that not all typing rules in an exemplary embodiment need to use these two records. Thus, the rest of the type system can be independent of these aspects of the layout strategy.

C. "This" pointers

Each virtual method has a hidden parameter—the "this" pointer. The "this" pointer is automatically initialized to a pointer to the object for which a method is invoked. When a method returns a reference to its current object, that reference is a "this" pointer. In an exemplary embodiment, within the intermediate representation, the typed method has a typed "this" pointer. Explicit adjustments on "this" pointers, in an exemplary embodiment, are necessary when subclasses override or inherit methods from superclasses, and are included in the intermediate representation.

Multiple inheritance may require "this" pointer adjustment when a subclass method overrides a superclass virtual method. If class C overrides a method m introduced in a superclass B, the implementation in C expects a C object. However, m may also be called on the embedded B object in C. In an exemplary embodiment, an "adjuster thunk" for m is placed in the vtable of the embedded B object in C. This thunk converts a B object embedded in a C object into a C object, and calls the new implementation on the C object.

Each component in ApproxR(P, $\tau$) 1000 can be identified by a path from a subclass to a superclass. If a B component exists within a C object (as is shown in FIG. 3) the B component has its own vtable 324. The "this" pointer must be specified such that only a B object in C will be allowed, in such a case, as opposed to a complete B object not embedded in a C object.

In an exemplary embodiment, each vtable corresponds to a path from the outermost object to a specific superclass inner object. Each virtual method contained in the vtable accepts only objects with the corresponding path as "this" pointers. The intermediate representation guarantees that if you get to an object by following a specific path and fetch a method from the object, you can only call the method on objects of the same path type. If the path type of an object is known, then the "this" pointer types of the virtual methods contained in the object are also known.

One complication with the "this" pointer is that if a superclass B defines a method, the subclass C should be able to reuse the method name and implementation. It doesn't need to redefine them. As an example consider a class B which defines a method m. If in C there is no method m defined, that is, there is no explicit overriding method m, then there is no actual overriding, either. The same method m, the one defined in B, is used. The same implementation must accept both complete B objects and inner B objects in C.

However, C can override the method m in B by giving a new body to method m. To guarantee soundness of dynamic dispatch, when a method o.m is called, the m should have a "this" pointer with the same path and the same runtime type of o. There is a mismatch of "this" pointer types between method implementations in the class and methods in the vtable.

To reconcile this problem, two different views for the "this" pointer exist. In a vtable, "this" pointer types of methods have the same path and runtime type as the object that corresponds to the vtable. A method implementation uses an existential type for the "this" pointer to abstract all possible paths.

Pseudo source code in an object-oriented programming language for the exemplary classes C and B shown in FIG. 3 is as follows;

```
Class B {
    void m( );
    int ib;
};
B *pb
Class C: virtual B {
    void m( );
    int ic;
};
C *pc
B *pb_in_c;
```

Figure 4:
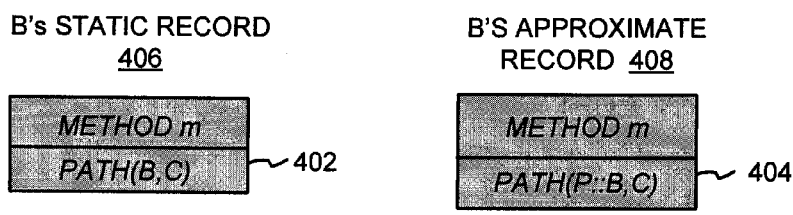
FIG. 4 is a block diagram illustrating an exemplary "this" pointer implementation in an exemplary exact type and an exemplary approximate record type in the typed intermediate representation.

FIG. 4 shows the method m in B's vtable in R(C) 402, and the method m in B's vtable in ApproxR(P, τ) where r is a subclass of C and P is a path from τ to C. If Class C overrides the method m defined in B, by, for example, the call "pb_in_c->m( )" the new implementation of m in C might access C's fields 323. The new implementation in C must expect a C object as the "this" pointer. However, the method m within the vtable for the B part 402 of a C object expects a B object or something that looks like a B object. To put the new implementation in the vtable for the B part, the offset from B to C must be added to the "this" pointer so that the vtable for B actually contains methods for objects that look like B. The "this" pointer of m in B's vtable has type Path(B,C). After subtracting from it the offset (a compile-time known integer) from C to B, we get a pointer to the C object and call the new implementation on the C object. Compilers do this transparently. The intermediate language mirrors the compiler method. For example, one method that compilers use to do this is to use "adjustor thunks."

With reference to FIG. 4, a method m 402 is found within the B object 324 of FIG. 3. The vtable entry in R(C) 900 (FIG. 9) for m 402 is generated using "this" pointer type "Path(B, C)" which indicates that m accepts B inner objects of C (but not complete B objects) as "this" pointers. The corresponding ApproxR 1000 entry has "this" pointer type "Path(P::B, τ)" 404 referring to the runtime type τ and the path P of the inner C object, indicating that only B part of C objects with the same runtime type τ and the same path P can be used as a valid "this" pointer Both overriding and inheriting methods require "this" pointer adjustment. Furthermore, suppose C<<B'<<B and P (C,B]. B' implements m with function f and no other classes between B' and C implement m. If B'=C it means that C overrides m, Otherwise, C inherits the implementation of f from B'. If adjuster thunks are used, then the adjuster thunk for m in C's vtable has the "this" pointer of type Path(P, C). Function f requires that "this" be a B' object with existential types. The thunk calls f after subtracting the displacement from B to B' from the "this" pointer and packing the result, which is a B' object, to a desired existential type. When B is a virtual base of C, the displacement from B to B' must be statically known as no displacements from virtual bases to their subclasses are stored within the objects. Therefore, "this" pointers of adjuster thunks must have concrete runtime types (that is, offsets known at compile time) and cannot use existential types that hide (or give a range for) their runtime type.

As discussed, subclasses can inherit method implementations in superclasses. To represent all possible subclass objects, an existential path type is used. The "this" pointer of a method implementation in class C is given type ∃α<<C.∃ρ:(α, C]. Path(ρ, α). representing any C object, either complete or embedded in subclass objects. For a thunk in the vtable of an object with path, the "this" pointer can only have the specified path P.

7. Exemplary Methods of Typing an Intermediate Representation of a Computer Program FIG. 7A illustrates an exemplary method 700 of typing an intermediate representation of a computer program, the computer program having notions of multiple inheritance and virtual inheritance. The computer program, preferably a source code program, may be for any object-oriented language where some code portions classify other code portions based on classes, and where the language that the computer program is written in supports virtual inheritance of classes and multiple inheritance of classes. Examples of such languages include C++ and C++ like languages.

At process block 710, compiler (e.g., 110 at FIG. 1), receives a source code representation of a computer program to generate a typed intermediate representation 115 (FIG. 1) of the source code. At process block 720, a typed intermediate representation is generated by the compiler 115 (FIG. 1). This intermediate representation preserves notions of type for objects of classes with multiple inheritance and virtual inheritance. As part of the generation process, a representation of at least one class is generated.

Two record types are generated for this exemplary class, an exact record, an exemplary generation of which is shown in FIG. 7B, and an approximated record, an exemplary generation of which is shown in FIG. 7C. Both the exact record type, e.g., 900 (FIG. 9) and the approximated record type, e.g., 1000 (FIG. 10) preserve at least a portion of the object layout as stored in an internal version of the computer resource (such as a file or memory).

Turning to FIG. 7B, an exact record type for a class is generated at process block 722. An exemplary exact record type is R(C), described above. As shown at process block 725, generating the exact record type comprises generating a layout for the class. In turn, generating a layout for the class comprises, at least, generating the offsets from the inner objects of an outer object to any inner virtual base objects. This record type, when generated, will be used to represent layout when the actual runtime type of an object is known.

The exact record also includes typed methods with typed "this" pointers. The intermediate representation generates "this" pointer types 735 as described above.

Another record type, the approximate record type, is generated and is used to represent objects when the actual runtime type is not known. An exemplary embodiment of the approximate record is ApproxR(P, τ) described above. In ApproxR(P, τ), types of both "this" pointers of methods in vtables 755 and offsets to virtual bases in vbptr 750 refer to P and τ.

Objects whose source type is C (either complete C objects or embedded C objects in C's subclass objects) are translated to have the existential type "∃α<<C.∃P:(α, C]. Path(P, α)" in the typed intermediate representation. These objects can be opened to objects of type "Path(P, α)", and then coerced to records of type ApproxR(P, α).

8. Exemplary System Which Describes the Layout of a Class in a Typed Intermediate Representation of a Source Code Representation of an Object-oriented Language.

FIG. 8 describes an exemplary system used to represent an intermediate typed representation 802 of a source code representation of an object-oriented language which defines classes, the classes allowing both virtual and multiple inheritance. The intermediate representation 802 comprises an exact record type, in an exemplary embodiment, which types an object of the class 804 by describing the layout of the object as defined in the runtime version of the source code. This representation describes multiply inherited objects, virtual objects and non-virtual objects according to the underlying runtime representation. It includes representations of the offsets to virtual bases.

An approximate record type ApproxR(P, τ) 906 is used to describe the layout of an object when the runtime type is not known. It describes the statically known components of the object, referring to both the actual runtime type τ and the path P of the object.

The intermediate representation further comprises a representation of "this" pointer types for virtual methods, such that when a subclass overrides a virtual method in a superclass, the "this" pointer is adjusted appropriately to view the subclass object as a superclass object.

9. Exemplary Type Syntax in the Exemplary Intermediate Representation

Based on the descriptions above of a type intermediate representation wherein class name-based information related to classes are retained, and where the underlying computer language has notions of multiple and virtual inheritance, at least some types for such a typed intermediate representation are as shown in Table 1, below.

The rules as expressed above and from hereon are just one set of embodiments of one set of representations of the actual rules that can be applied in a computer program implementing a typed intermediate language. Other embodiments and other representations of the rules that apply principles expressed with reference to these rules are also possible. For instance, notations, operands and operators of the rules may be changed in form without deviating from the principles expressed therein.

TABLE 1

Syntax: Kinds and Types

| | |
|---|---|
| (kind) | $\kappa ::= \Omega \mid \Omega_c$ |
| (path) | $P ::= \epsilon \mid VB :: C \mid \rho \mid P::C$ |
| (type) | $\tau ::= \text{int} \mid C \mid \text{Tag}(\tau) \mid \text{Ptr}^\psi \tau$ |
| | $\mid \{l_i^{\phi i} : \tau_i\}_{i=1}^n \mid \{\{l_i^{\phi i} : \tau_i\}\}_{i=1}^n$ |
| | $\mid \{\tau_1,...,\tau_n\} \to \tau \mid \exists \rho : (\tau_s,...,\tau_e). \tau$ |
| | $\mid \alpha \mid \forall \alpha << \tau. \tau' \mid \exists_\alpha << \tau. \tau' \mid$ |
| | $\mid \text{Path}(P,\tau) \mid \text{Disp}(P_1,P_2,\tau)$ |
| (tvars) | $\text{tvs} ::= \bullet \mid \alpha << \tau, \text{tvs}$ |
| (mutability) | $\phi ::= I/M$ |

The first syntax category, kind includes kind $\Omega$ for all types and kind $\Omega_c$ that classifies class names and type variables that will be instantiated with class names. $\Omega_c$ is a subtype of $\Omega$.

Path P represents paths, as described above. A path is either an empty path $\epsilon$, a path from an object to a virtual base (with the flattening of the hierarchy already described taken into account) VB::C, a path variable $\rho$, or a path appended with a class name P::C. P::(C1:: . . . :: $C_n$) is equivalent to (P::C1):: . . . :: $C_n$. The keyword "VB" must be followed by a virtual base, as the path VB::C indicates the path to the virtual base C from the enclosing object. A non-empty path begins with one of: "VB" followed by a class name (which must be a virtual base), a class name, or a path variable. The rest of the path must be a sequence of class names.

Standard types include integer type int, pointer type $\text{Ptr}^\psi \tau$, and record type $\{l_1^{\Phi 1} : \tau_I\}_{i=1}^n$. Also included is function type $(\tau_1,...,\tau_n) \to \tau$, and type variable $\alpha$. Existential type $\exists \alpha << \tau. \tau$. and universal type $\forall \alpha << \tau. \tau$ are subclassing-bounded quantified types, denoted by the subclassing constraints on type variables. Type variables are given bounds in terms of subclassing.

At least some types are defined that are used specifically to represent multiple inheritance. These include special types of path abstractions that take into account the multiple paths through an object that exist when multiple inheritance is allowed. For instance, $\exists \rho : (\tau_s \tau_e]. \tau$ is an existential type that hides a path that starts with the class $\tau_s$ and ends with $\tau_e$, where $\rho$ is the path variable, where $\tau_s$ represents the runtime type of an object and $\tau_e$, represents the static type of the same object. $\text{Disp}(P_1, P_2, \tau)$ represents the displacement from an inner object following $\text{Path}_1$ to another object, which must be a virtual base, following $\text{Path}_2$ in the outer object, whose runtime type is $\tau$. Both $P_1$ and $P_2$ must start at $\tau$.

Type variables (tvars) are indicated by the string "tvs" which represents a sequence of type variables, each bounded by either a superclass or another type variable.

Mutability is indicated using $\phi$. This annotation, $\phi$, when used with pointers, indicates that the values that are pointed to by the pointer can be modified by assignment. The letter "M" indicates that an expression is modifiable (mutable), while an "I" indicates that the expression is not modifiable. Annotation with the "M" and the "I" on field labels indicates whether or not the corresponding fields are mutable. "I" can be omitted, as the default is "not mutable."

10. Exemplary Syntax for Expressing Values and Expressions in the Exemplary Typed Intermediate Representation Based on the syntax described above for the type intermediate representation, at least some of the values and expressions in the typed intermediate representation are shown in Table 2, which follows:

TABLE 2

Syntax: Values and Expressions $\text{ptr} ::= l \mid \text{ptr}.l$
$v ::= n \mid C(v) \mid \text{tag}(C) \mid \text{pack } \tau \text{ as } \alpha << \tau_u \text{ in } (v : \tau')$
$\mid v \bullet C \mid \text{ptr} \mid \text{pack P as } \rho : (\tau_s \tau_e] \text{ in } (v : \tau)$
$\mid \text{disp}(P_1, P_2, C) \mid \{l_i = v_i\}_{i=1}^n$
$\text{hv} ::= \{l_i = v_i\}_{i=1}^n \mid \text{fix } g <\text{tvs}>(x_j : \tau_j) : \tau = e_m$
$e ::= x \mid n \mid l \mid \text{tag}(C) \mid C(e) \mid c2r(e)$
$\mid \text{new } [\tau] \{l_i = E_i\}_{i=1}^n \mid e.l \mid \{l_i = E_i\}_{i=1}^n$
$\mid x .\tau = e_1 \text{ in } e_2 \mid e[\tau_1, ..., \tau_m](e_1, ..., e_n)$
$\mid v \bullet C \mid *e \mid *e_1 = e_2 \text{ in } e_3$
$\mid \text{pack } \tau \text{ as } \alpha << \tau_u \text{ in } (e : \tau')$
$\mid (\alpha, x) = \text{open}(e_1) \text{ in } e_2$
$\mid \text{pack P as } \rho : (\tau_s \tau_e] (e : \tau)$
$\mid (\rho, x) = \text{open}(e_1) \text{ in } e_2$
$\mid e \oplus C \mid e \ominus c \mid e_1 \text{ } \cancel{e}e_2 \mid e_1 \cup e_2 \mid \text{disp}(P_1, P_2, C)$ The pointers in typed intermediate representation have two possible forms: l, and ptr.l. Pointer ptr can be a heap label l, indicating it is a pointer to a value on the heap. Pointer ptr can also be an interior pointer ptr.l which points to the field l of a record, the record pointed to by ptr.

The typed intermediate representation also includes, but is not limited to, word-size values (represented by "v"), as discussed in this paragraph. These include the integer literal n. Expression C(v) coerces a record labeled by v to an object of the class name "C".

The expression tag(C) represents a tag value, such as shown at 315, 325, and 335 (FIG. 3). The existential pack operation of "pack τ as $\alpha << \tau_u$ in (v : τ')" relates to introduction of an existential type comprising a type variable with subclassing bounds. "v•C" describes a C inner object in value v.

"hv" defines heap-allocated values as records. The function fix g⟨ ⟩tvs⟨ ⟩(x$_1$: τ$_l$): τ=e$_m$ defines g with type parameters tvs, and formals of type (x$_l$ ... x$_n$), where they formals are of type τ$_1$ ... τ$_n$, respectively. The return type is τ, and the function body is e$_m$. Function body e$_m$ may call g recursively.

"e" defines expressions of the typed intermediate language. C(e) and c2r(e) are coercions between objects and records. Expression C(e) coerces a record labeled by e to an object of the class name "C". The expression c2r(e), the opposite expression, coerces an object e to a record C. The existential pack operation of "pack τ as α<<τ$_u$ in (e: τ')" introduces an existential type comprising a type variable with sub-classing bounds. The expression "(α, x)=open (e$_1$) in e$_2$", the opposite expression, eliminates the subclassing-bounded existential type.

Several expressions are used to handle the specific situations that arise when typing a language which allows multiple inheritance and virtual inheritance. These include, but are not limited to, the pack and open expressions pack P as ρ: (τ$_s$τ$_e$] in (e: τ), and (ρ, x)=open(e$_1$) in e$_2$. The pack expression introduces the path abstraction. Specifically, it hides path P from the starting location τ$_s$ to the ending location τ$_e$. This hidden path is represented by the path variable ρ used in the expression "e". The opposite expression (ρ, x)=open(e$_1$) in e$_2$ eliminates a path abstraction. It opens the expression e$_1$, which exposes the heretofore hidden path ρ, and a value variable x.

The displacement of superclass objects within a subclass object is not straightforward, as detailed with reference to FIGS. 3, 9, and 10, and their associated text. Specific arithmetic operators are used to accurately capture these displacements. The expression "e⊕C" points to a C inner object, where C must be a direct non-virtual base of the type e.

The opposite expression "e⊖C" points to the enclosing outer object of the C inner object. In the expressions "e$_1$⊌e$_2$" and "e$_1$∪e$_2$", e$_1$ is an object and e$_2$ is a displacement from the e$_1$ object to a virtual base. The expression "e$_1$⊌e$_2$" adds to the object e$_1$ the displacement to the virtual base (e$_2$). Similarly, the expression "e$_1$∪e$_2$" subtracts from object e$_1$ the displacement.

11. Dynamic Semantics

Expression "c2r(C(v))" coerces object C(v) to record. Expression "c2r(C(v)•P)" coerces an inner object of C(v) following path P to an interior pointer v.P.

Expression "v⊕C" adds to record v the displacement to the inner object C and returns an interior pointer v•C, which points to the C inner object of v. This is used when C is a direct non-virtual super class of the runtime type of v. Expression "(v•C)⊖C" subtracts the displacement from the inner object C and returns the record v. The symbols ⊌ and ∪ are used to represent pointer adjustment. Expression "(v•P$_1$)⊌v$_2$" returns an interior pointer v•P$_2$, if v$_2$=disp(P$_1$, P$_2$, C) which represents the displacement from P$_1$ to P$_2$ in C. Expression "(v•P$_2$)∪v$_2$" subtracts the displacement v$_2$ from the interior pointer v•P$_2$ and returns the result v•P$_1$.

12. Static Semantics

The typed intermediate language is sound, and its type checking is decidable, as shown in Table 3, below. In an exemplary embodiment, the intermediate typed language has a class declaration table Θ that maps class names to declarations. A kind environment Δ tracks type variables and path variables with regards to scope. Each type variable has a subclassing upper bound, which is either a class name or another type variable which already exists within the kind environment Δ. A path variable has a constraint of the form (τ$_s$,τ$_e$] which defines a path that starts with the class τ$_s$ and ends with τ$_e$. A heap environment E maps labels to types. A type environment Γ maps variables to types.

In an exemplary embodiment, class names and type variables (which can be instantiated with a class name) only have kind Ω$_c$. All of the following types must be of kind Ω$_c$: the bounds in subclassing-bounded quantified types, the type in tag types, and the starting and ending types of paths.

Only records of type R(C) can be coerced to C outermost objects of type Path(ε, C). A record coerced from a C outermost object has type R(C). A record coerced from an inner object of type Path(P, τ) has type ApproxR(P, τ), which defines the layout of the inner object.

The soundness is proved by progress and preservation, as shown below. The decidability of type checking is proved by the decidability of subtyping, also shown below, combined with the minimal type property.

TABLE 3

Theorems

THEOREM 1 (PRESERVATION). If Σ⊢ Prog : τ and Prog ↦Prog', then ∃Σ' ⊢ such that Σ'⊢Prog':τ.
THEOREM 2 (PROGRESS). If Σ⊢ Prog:τ,then either the the main expression in Prog is a value, or ∃Prog' such that Prog ↦Prog'.
THEOREM3 (DECIDABILITY OF TYPE CHECKING). It is decidable whether Θ; Δ; E; Γ ⊢ e : τ holds.

13. Translating a Source Language with Multiple Inheritance and Virtual Inheritance into a Typed Intermediate Representation This section shows how to translate an exemplary source code language with multiple inheritance and virtual inheritance into a typed intermediate representation. The exemplary language, the syntax of which is shown in Table 4, below, comprises object creation, field fetch/assignment, method invocation, local variable binding and upcasts. The source language, in this embodiment, assumes some preprocessing: explicit upcasts are inserted when necessary; member access from an object requires that the object be of the class that introduces the member; when creating a new object of class C, fields introduced by C itself are differentiated from those of C's non-virtual bases and those of from C's virtual bases.

TABLE 4

Syntax of an exemplary source language

| | |
|---|---|
| P | := ε / VB :: C\|P :: C |
| τ | := int\|C |
| e | := n\|l\|x\|x:τ = e$_1$ in e$_2$\|{l$_i$ = e$_i$}$_{i=1}^n$ |
| | \|newC{(f$_i$ = e$_i$)$_{i=1}^n$,(A$_i$ = e'$_i$)$_{i=1}^p$,(B$_i$ = e$_i^n$)$_{i=1}^q$} |
| | \|e.f$_i$\|e$_1$.f$_i$ := e$_2$ in e$_3$ |
| | \|e.m(e$_1$,...,e$_n$)\|I[Cast[D](e) |
| v | := n\|l\|l.P\|{l$_i$ = v$_i$}$_{i=1}^n$ |
| hv | := C{ f$_1$ = v$_1$,...,f$_n$ = v$_n$ } |
| mdecl | := τm(x$_1$ : τ$_1$,...,x$_n$) = e |
| cdecl | := C : A,virtual B{ f$_1$ : τ$_1$,...,f$_n$ : τ$_n$, mdecl$_1$,...,mdecl$_k$ } |
| prog | := cdecl$_1$,...,cdecl$_n$ in e |

The paths in the exemplary source language are the same as the paths in the typed intermediate language that contain no path variables. A class declaration can specify direct non-virtual and virtual bases of the class, a set of new fields, and a set of method implementations, including both new and overridden methods.

1. Types

A class name C in the source language is translated to an existential type with type and path abstractions, which represents a C inner object in a subclass object, as shown below in Table 5.

TABLE 5

Translating a class name to an existential type $|int| = int$
$|C| = \exists \alpha <\!\!<\!C. \exists \rho : (\alpha, C]. Path(\rho, \alpha)$
$|(\tau_1,...,\tau_n) \rightarrow \tau| = (\,|\tau_1|,..., |\tau_n|) \rightarrow |\tau|$

2. Expressions

A "new" expression is translated by inserting vtables into inner objects, and grouping the inner objects of virtual bases. A function "|e,P|" (shown in Table 6, below) translates an inner object e that follows path P. If e contains no inner objects, (the corresponding class has no non-virtual bases and e (such as E in FIG. 2F) is an innermost object) then the vtable for the corresponding path vtable$_p$ is inserted as the first field to e. If e does contain inner objects, then the function "|e,P|" is called recursively to translate each set of nested inner objects.

TABLE 6

Translating inner objects $|\{f_i = e_i\}_{i=1}^n, P| = \{vtable = vtable_P, (f_i = |e_i|)_{i=1}^n\}$
$|\{(A_i = e_i')_{i=1}^p, (f_i = e_i)_{i=1}^n\}, P| =$
$\{(A_i = |e_i', P :: A|)_{i=1}^p, (f_i = |e_i|)_{i=1}^n\}$ To create an object of C that has no non-virtual bases, a vtable (314, 324, 334 in FIG. 3) is inserted into each C object. The vtable (314, 324, 334 in FIG. 3) (which in an exemplary embodiment can be called vtable) contains the tag to the object C (315, 325, 335 in FIG. 3), the vbptr to displacements to the virtual bases (318 and 328 in FIG. 3) and the methods (317 in FIG. 3) for C.

The upcast expression allows upcasting in the source language. In an exemplary embodiment, downcasting is not allowed. The translation of the upcast expression adds an appropriate offset to the object to cast. Both nonvirtual and virtual bases can be cast. Casting to a non-virtual base is performed by adding the compile-time known offset to the object. Casting to a virtual base involves fetching the displacement from the vtable (314, 324, 334 in FIG. 3) by way of the vbptr (328, 338 in FIG. 3). A function "firstPath(C)" is provided to return the first path of class C, where the first path of a class C starts at C and follows the first direct non-virtual bases until it arrives at a class with no non-virtual bases. In an exemplary embodiment, Class C shares a vtable with each superclass of C in C's first path. This can be seen in FIG. 3, where C 310 and A 310 (the first and only direct non-virtual base of C) share the vtable 314.

3. Methods

As shown in Table 7, below, methods are translated to functions with explicit "this" pointers. "|m,C|" means the translation of method m that is implemented in class C.

TABLE 7

Method Translation $|\tau m(x_1 : \tau_1,...,x_n : \tau_n) = e, C| =$
$fixm(this:|C|, x_1:|\tau_1|,...,x_n|\tau_n|):|\tau| = |e|$

4. This Pointer Adjustment

Creating vtables requires thunks to adjust the "this" pointers of methods. Function "adjust(this, P, P', C)" (shown in Table 8) transforms "this" of type Path (P, C) to type Path (P', C), provided that P and P' are valid paths from C. If P does not involve a virtual base, then P' must be a prefix of P. P-P' is the difference between the two paths.

TABLE 8

The adjust function translation adjust(this, P, $\epsilon$, C)=this $\cup$ disp($\epsilon$, P, C) P = V B::...
adjust(this, P, P', C)=this $\ominus$ (P–P') otherwise Table 9 shows the creation of adjustor thunks. Suppose class A introduces a method m of type $(\tau_1, \ldots, \tau_n) \rightarrow \tau$ and P:(C,A]. "|m,P,C|" creates an adjuster thunk for the m entry in vtable$_p$, which has "this" pointer type Path(P, C). The body of the new function calls $l_m$, which is the implementation of m in class A' and P': (C,A'] and no classes between A' and C override m. The thunk uses the "adjust" function to get a "this" pointer of type |A'| expected by $l_m$. The thunk can share the same address with $l_m$ if they only differ in coercions of "this" pointers.

TABLE 9

Class Translation $|m,P,C|=$
$l_{m'} \rightarrow fix\ m_{<>}(this : Path(P,C),(xi:\tau_i)_{i=1}^n):\tau$
$= l_m(pack\ C\ as\ \alpha <\!\!<\ A'\ in\ pack\ P'\ as\ \rho:(C,A']$
$in\ ((adjust(this,P,P',C):Path(\rho,C))$
$:\exists \rho:(\alpha,A']. Path(\rho,\alpha)), x_1,...,x_n\ )$

Figure 11:
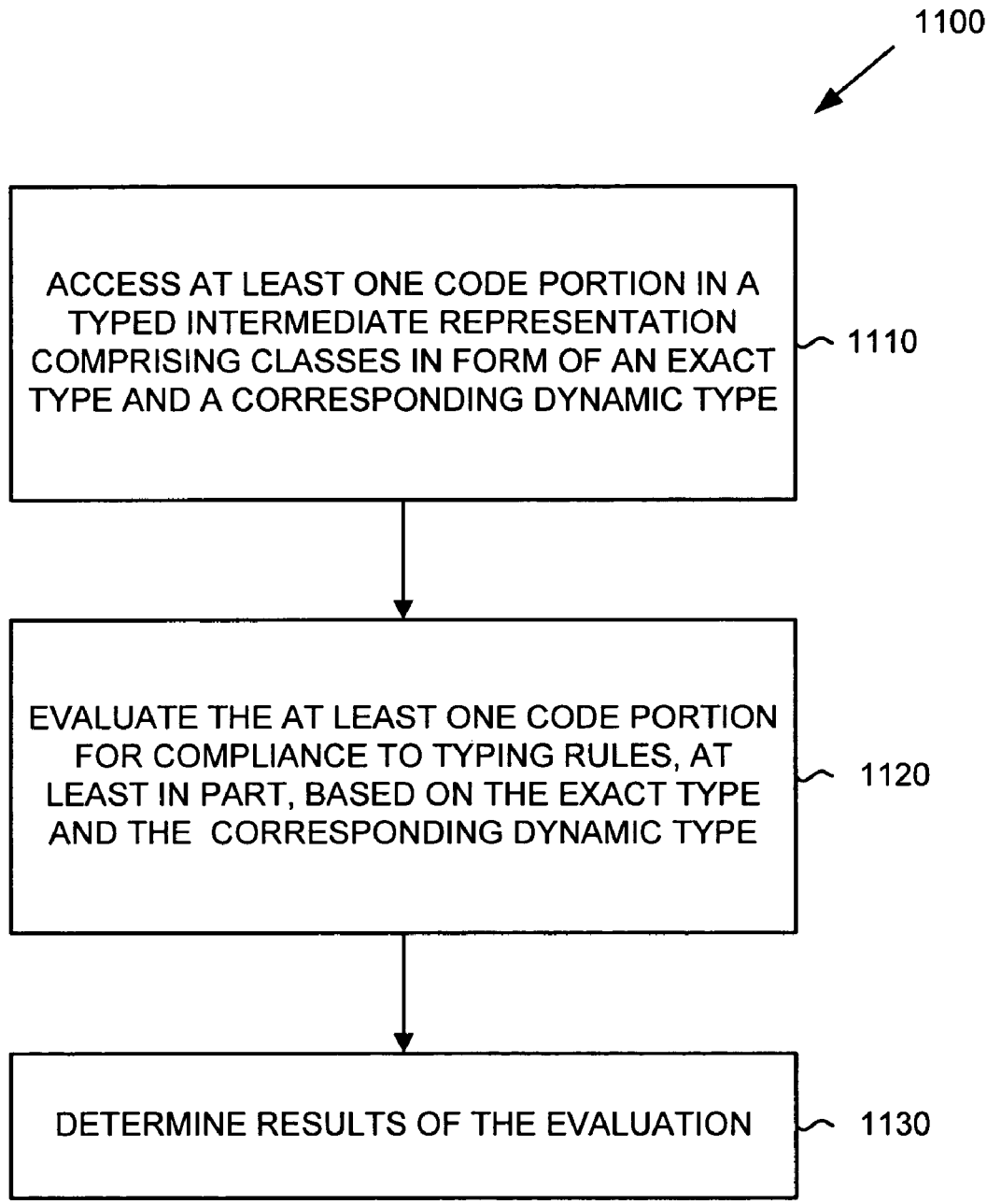
FIG. 11 is a flow diagram illustrating an exemplary method for type checking a typed intermediate representation of a computer program compiled from its source code representation in an object-oriented language.

14. An Exemplary Method for Type Checking an Exemplary Typed Intermediate Representation FIG. 11 illustrates an exemplary method 1100 implemented by a type checker (e.g., 120 in FIG. 1) for applying typing rules (e.g., 130) to evaluate the type safety of the intermediate representation (e.g., 115 ). At 1110, for instance, the type checker accesses code portions in a typed intermediate representation of a computer program compiled from its source code representation in an object-oriented language which supports multiple inheritance and virtual bases. The typed intermediate representation (e.g., 115) comprises classes with corresponding exact record types and approximate record types. Thus, type checking based on both objects whose runtime type is known and objects whose runtime type is not known are both possible in the typed intermediate representation. As noted above, even with objects whose classes comprise complex inheritance hierarchies involving multiple inheritance and virtual inheritance, inner objects can be typed, as can the "this" pointers of methods in such objects even when subclasses inherit or override superclass methods.

Typing rules related to code portions such as expressions can be based on path types, both those known and unknown at runtime. Exact paths are determined at compile time to define objects whose types are known at compile time. Abstract paths are used at compile time for objects with unknown paths and unknown runtime types. Address arithmetic for adding and subtracting offsets from subclass objects to superclass objects is used to capture pointer adjustment. At 1120, such typing rules are applied to evaluate the type safety of at least one code portion of the typed intermediate representation.

Later at 1130, once the type safety evaluation of the code portion is complete, the results of the evaluation are determined.

15. Computing Environment

Figure 12:
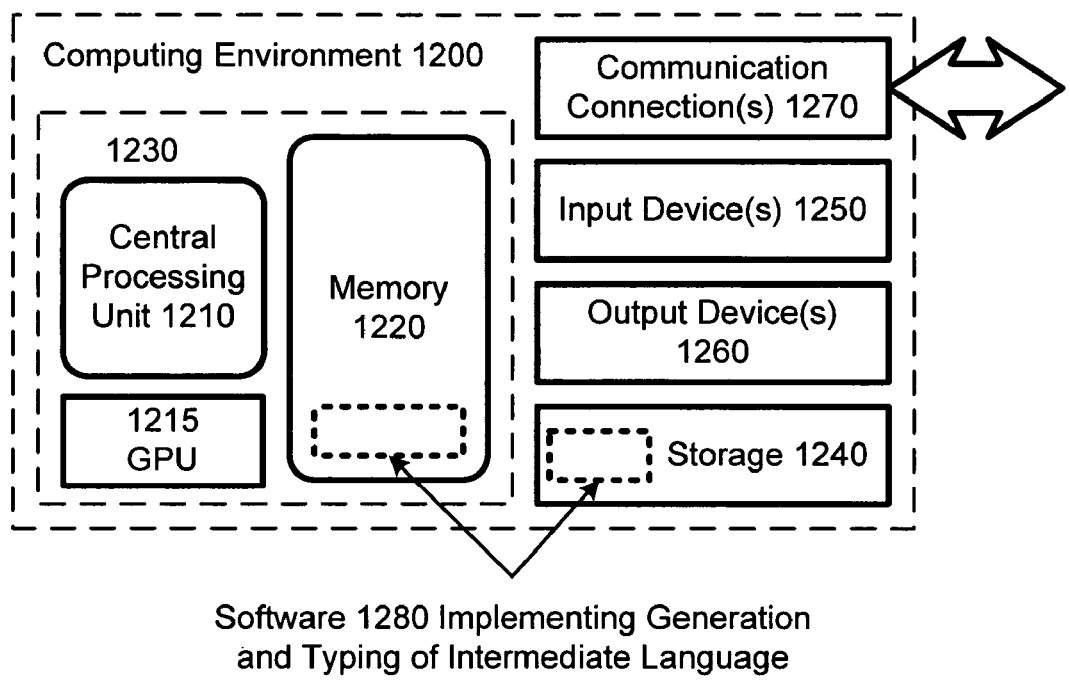
FIG. 12 is a diagram depicting a general-purpose computing device constituting an exemplary system for implementing the disclosed technology.

FIG. 12 and the following discussion are intended to provide a brief, general description of an exemplary computing environment in which the disclosed technology may be implemented. For instance, any of the functionalities described with respect to compiling a source code representation in FIG. 1 can be implemented in such a computing environment. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 12 illustrates a generalized example of a suitable computing environment 1200 in which described embodiments may be implemented. The computing environment 1200 is not intended to suggest any limitation as to scope of use or functionality of the invention, as the present invention may be implemented in diverse general-purpose or special-purpose computing environments.

With reference to FIG. 12, the computing environment 1200 includes at least one central processing unit 1210 and memory 1220. In FIG. 12, this most basic configuration 1230 is included within a dashed line. The central processing unit 1210 executes computer-executable instructions and may be a real or a virtual processor. The environment 1200 further includes the graphics processing unit GPU at 1215 for executing such computer graphics operations as vertex mapping, pixel processing, rendering, and texture mapping. In a multi-processing system, multiple processing units execute computer-executable instructions to increase processing power and as such the GPU and CPU can be running simultaneously. The memory 1220 may be volatile memory (e.g., registers, cache, RAM), non-volatile memory (e.g., ROM, EEPROM, flash memory, etc.), or some combination of the two. The memory 1220 stores software 1280 implementing the described methods of generating typed intermediate language, and of type-checking the generated intermediate language.

A computing environment may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other medium which can be used to store information and which can be accessed within the computing environment 1200. The storage 1240 stores instructions for the software 1280 implementing methods of generating typed intermediate language, and of type-checking the generated intermediate language.

The input device(s) 1250 may be a touch input device such as a keyboard, mouse, pen, or trackball, a voice input device, a scanning device, touchscreen, or another device that provides input to the computing environment 1200. For audio, the input device(s) 1250 may be a sound card or similar device that accepts audio input in analog or digital form, or a CD-ROM reader that provides audio samples to the computing environment. The output device(s) 1260 may be a display, printer, speaker, CD-writer, or another device that provides output from the computing environment 1200.

The communication connection(s) 1270 enable communication over a communication medium to another computing entity. The communication medium conveys information such as computer-executable instructions, compressed graphics information, or other data in a modulated data signal. These connections may include network connections, which may be wireless connections, may include dial-up connections, and so on.

Computer-readable media are any available tangible media that can be accessed within a computing environment. By way of example, and not limitation, with the computing environment 1200, computer-readable media include memory 1220, storage 1240, communication media, and combinations of any of the above.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A computer implemented method comprising:

receiving source code in an object-oriented language, wherein the source code defines a class hierarchy having an inner object defined in the class hierarchy as inherited, directly or indirectly, by an outermost object of the class hierarchy, and wherein the outermost object implements multiple inheritance;

determining, in a computer, a complete class inheritance path from the outermost object to a runtime type of the inner object; and during type checking, in an intermediate representation of the source code, using a path type to represent a type of the inner object within the outermost object, wherein the path type comprises the complete class inheritance path from the outermost object to the runtime type the inner object;

wherein the path type comprises an existential type if the runtime type of the inner object is not known; and wherein the existential type comprises a complete class inheritance path from the outermost object to each possible inner object.

2. The method of claim 1, wherein, for an inner object of a class (C), the existential type comprises:

$\exists \alpha \ll C. \exists \rho : (\alpha, C] \, Path(\rho, \alpha);$ wherein $\alpha$ comprises a type variable identifying a runtime type of the outermost object, which comprises C or a subclass of C; and ρ abstracts an inheritance path from the outermost object to the inner object.

3. The method of claim 1, further comprising only allowing a second object with the path type of the inner object be passed to a method of the inner object.

4. The method of claim 1, wherein:
the source code comprises a class with a superclass;
the intermediate representation comprises an exact record type having an offset between the class and the superclass; and
the method further comprises casting an object of the class to an object of the superclass by adding the offset between the class and the superclass to the object of the class.

5. The method of claim 1, wherein:
the source code comprises a class with a superclass;
the intermediate representation comprises an exact record type having an offset between the class and the superclass; and
the method further comprises casting an object of the superclass to an object of the class by finding an offset between the class and the superclass and then subtracting the offset between the class and the superclass from the object of the superclass.

6. The method of claim 5, wherein the superclass is a direct virtual base and the offset between the class and the superclass is associated with a vbptr, the vbptr stored in a vtable associated with the class.

7. The method of claim 1, wherein:
the source code comprises a class with a direct virtual superclass, each object of the class having respective vbptr pointer fields; and
the method further comprises casting an object of the class to an object of the superclass, the object of the class having a vbptr pointer field which stores a pointer to a table of casting offsets, wherein a casting offset that corresponds to the superclass comprises an offset between the vbptr pointer field and the superclass.

8. The method of claim 7, further comprising using the vbptr pointer field to locate the casting offset and then adding the casting offset to the object of the class.

9. The method of claim 1, wherein:
the source code comprises a class with a superclass, a virtual method being defined in the superclass and overridden in a subclass; and
the method further comprises casting an inner object of the superclass to an object of the subclass when calling a method on the inner object wherein a method of the superclass object stores, in a vtable, an offset from the inner object of the superclass to the object of the subclass, and casting comprises adding the offset to the object of the superclass.

10. The method of claim 1, wherein the inner object has a method and wherein a "this" pointer associated with the method has the same path type as the inner object.

11. The method of claim 1, wherein:
the source code comprises a first class, a second class which is a direct virtual base of the first class, and a third class which is a direct virtual base of the second class; and
the method further comprises casting the first class to the third class by casting the first class to the second class and then casting the second class to the third class.

12. A computer system for using an intermediately compiled source code program, the computer system comprising: a computer comprising at least one processor and memory, wherein the computer is configured to implement:
a path assigner which assigns a first path to a first object of a first class, the first object being an inner object of an outermost, second object of a second class, the first path comprising an offset from the outermost, second object to the first object;
a path checker which ensures that a method of the first object only accepts objects with a type of the first path;
an offset locator which locates an offset between the first class and the second class by looking at a record in the second class which stores the offset between the first class and the second class when the first class is a direct virtual base of the second class, and
a "this" pointer adjuster which casts the first object to the outermost, second object by subtracting from the first object the offset between the first class and the second class located by the offset locator when a virtual method defined in the first class but overridden in the second class is called on the first object.

13. The computer system of claim 12, further comprising an existential path assigner which assigns an existential path to a third object when runtime type of the third object is not known.

14. The computer system of claim 12 wherein, for an inner object of a class (C), the existential path comprises:
$\exists \alpha << C . \exists \rho:(\alpha, C]$ Path$(\rho, \alpha)$; and
wherein $\alpha$ comprises a type variable identifying a runtime type of the outermost, second object, which comprises C or a subclass of C; and
ρ abstracts a path from the outermost, second object to the inner object.

15. A computer-readable storage medium tangibly embodying computer-executable instructions for performing a method comprising:
receiving source code in an object-oriented language, wherein the source code defines a class hierarchy having an inner object defined in the class hierarchy as inherited, directly or indirectly, by an outermost object of the class hierarchy, and the outermost object implements multiple inheritance;
determining, in a computer, a complete class inheritance path from the outermost object to a runtime type of the inner object;
during type checking, in an intermediate representation of the source code, using a path type to represent a type of the inner object within the outermost object, wherein the path type comprises the complete class inheritance path from the outermost object to the runtime type of the inner object;
wherein the runtime type of the inner object is not known at compile time;
the path type comprises an existential type when the runtime type of the inner object is not known;
for an inner object of a class (C), the existential type comprises:
$\exists \alpha << C . \exists \rho:(\alpha, C]$ Path$(\rho, \alpha)$;
wherein $\alpha$ comprises a type variable identifying a runtime type of the outermost object, which comprises C or a subclass of C; and
ρ abstracts a path from the outermost object to the inner object.

* * * * *